(12) United States Patent
Takahashi et al.

(10) Patent No.: US 11,314,219 B2
(45) Date of Patent: Apr. 26, 2022

(54) INFORMATION DEVICE, TERMINAL DEVICE AND RECORDING MEDIUM

(71) Applicant: OMRON Corporation, Kyoto (JP)

(72) Inventors: Daisuke Takahashi, Moriyama (JP); Hidehiko Sekimoto, Nagaokakyo (JP); Kiyotaka Ueda, Kusatsu (JP); Yuichi Wakayama, Nagoya (JP)

(73) Assignee: OMRON Corporation, Kyoto (JP)

( * ) Notice: Subject to any disclaimer, the term of this patent is extended or adjusted under 35 U.S.C. 154(b) by 42 days.

(21) Appl. No.: 16/639,584

(22) PCT Filed: Sep. 7, 2018

(86) PCT No.: PCT/JP2018/033236
§ 371 (c)(1),
(2) Date: Feb. 16, 2020

(87) PCT Pub. No.: WO2019/059001
PCT Pub. Date: Mar. 28, 2019

(65) Prior Publication Data
US 2020/0225631 A1    Jul. 16, 2020

(30) Foreign Application Priority Data
Sep. 22, 2017    (JP) .............................. JP2017-182922

(51) Int. Cl.
*G05B 19/05*    (2006.01)
*G05B 19/10*    (2006.01)

(52) U.S. Cl.
CPC ......... *G05B 19/054* (2013.01); *G05B 19/056* (2013.01); *G05B 19/058* (2013.01);
(Continued)

(58) Field of Classification Search
CPC .. G05B 19/054; G05B 19/056; G05B 19/058; G05B 19/10; G05B 2219/23135;
(Continued)

(56) References Cited

U.S. PATENT DOCUMENTS

2002/0095230 A1*  7/2002  Bergo ................ G05B 19/4183
                                                              700/96
2006/0179120 A1*  8/2006  Kegoya .................. G05B 19/05
                                                              709/217
(Continued)

FOREIGN PATENT DOCUMENTS

EP    2960734        12/2015
JP    H07160311      6/1995
(Continued)

OTHER PUBLICATIONS

"Search Report of Europe Counterpart Application", dated May 7, 2021, pp. 1-11.
(Continued)

*Primary Examiner* — Kenneth M Lo
*Assistant Examiner* — Jonathan Michael Skrzycki
(74) *Attorney, Agent, or Firm* — JCIPRNET

(57)    ABSTRACT

Updating performance of a display screen in a terminal device that displays a screen for remotely monitoring an object to be controlled by a control device is appropriately maintained. An information device for factory automation connected to the control device that controls an object communicates with a terminal device having a display capable of displaying a screen for remotely monitoring the control device. The screen includes one or more components. The screen data for displaying the screen includes attributes of the respective components relating to the display, and a logic executed by the programmable indicator to determine the attribute values. When the terminal device (Continued)

displays a screen, the programmable indicator transmits the attributes and attribute values of the respective components in the screen data to the terminal device.

16 Claims, 19 Drawing Sheets

(52) U.S. Cl.
CPC .... *G05B 19/10* (2013.01); *G05B 2219/23135* (2013.01); *G05B 2223/06* (2018.08)

(58) Field of Classification Search
CPC ...... G05B 2223/06; G05B 2219/31457; G05B 19/4183; Y02P 90/02
See application file for complete search history.

(56) References Cited

U.S. PATENT DOCUMENTS

| | | | |
|---|---|---|---|
| 2006/0190624 | A1 | 8/2006 | Kegoya et al. |
| 2007/0180395 | A1 | 8/2007 | Yamashita et al. |
| 2013/0135331 | A1 | 5/2013 | Koara |
| 2015/0277404 | A1* | 10/2015 | Maturana ............... G05B 15/02 700/83 |
| 2019/0250596 | A1* | 8/2019 | Sun .................... G05B 19/0425 |

FOREIGN PATENT DOCUMENTS

| | | | | |
|---|---|---|---|---|
| JP | 2002091510 | | 3/2002 | |
| JP | 2004151762 | | 5/2004 | |
| JP | 2006072442 | | 3/2006 | |
| JP | 2008033573 | | 2/2008 | |
| JP | 2016012172 | | 1/2016 | |
| JP | 2017054379 | * | 2/2017 | ............ G06F 3/048 |
| JP | 2017054379 | | 3/2017 | |
| JP | 6125118 | | 5/2017 | |

OTHER PUBLICATIONS

"International Search Report (Form PCT/ISA/210) of PCT/JP2018/033236," dated Nov. 13, 2018, with English translation thereof, pp. 1-4.
"Written Opinion of the International Searching Authority (Form PCT/ISA/237) of PCT/JP2018/033236," dated Nov. 13, 2018, with English translation thereof, pp. 1-8.
"International Preliminary Report on Patentability (Form PCT/IPEA/409) of PCT/JP2018/033236," completed on Aug. 13, 2019, with English translation thereof, pp. 1-10.
"Office Action of Japan Counterpart Application" with English translation thereof, dated Jan. 25, 2022, p. 1-p. 8.
"Office Action of Japan Counterpart Application" with English translation thereof, dated Aug. 31, 2021, p. 1-p. 7.

* cited by examiner

| 609 screen ID | 610 component ID | 611 | | | | | | 612 event ID | 619 : business logic |
|---|---|---|---|---|---|---|---|---|---|
| | | 613 type of component | 614 background color | 615 character color | 616 position (X,Y) | 617 size (width, height) | 618 text | | |
| | Button1 | Button | white | black | 100, 100 | 10, 10 | AAA | 1(Press) | write 1 into variable var |
| | | | | | | | | 2(Release) | switch page into screen 2 |
| | Button2 | Button | white | black | 200, 200 | 20, 20 | BBB | — | — |
| | Lamp1 | Lamp | white | — | 300, 300 | 30, 30 | — | | display in white when variable var is 0 display in yellow when variable var is other than 0 |
| | Button3 | Button | blue | black | 400, 400 | 40, 40 | CCC | 3(Click) | change text of button 2 to "ABC" |

| screen ID | component ID | type of component | background color | character color | position (X,Y) | size (width, height) | event ID |
|---|---|---|---|---|---|---|---|
| | Button1 | Button | white | black | 100, 100 | 10, 10 | 1(Press) |
| | | | | | | | 2(Release) |
| | Button2 | Button | white | black | 200, 200 | 20, 20 | -- |
| | Lamp1 | Lamp | white | -- | 300, 300 | 30, 30 | -- |
| | Button3 | Button | blue | black | 400, 400 | 40, 40 | 3(Click) |

FIG. 7

| screen ID | component ID | event ID |
|---|---|---|
| | Button1 | 1 |

FIG. 8

| screen ID | component ID | attribute ID | value |
|---|---|---|---|
| | Lamp1 | (1)background colo | white |

(A)
HTTP request
GET /RemoteIF/MyProject1 HTTP/1.1
Host: 192.168.250.2
Upgrade: websocket
Connection: Upgrade
Sec-WebSocket-Key: dGhlIHNhbXBsZSBub25jZQ==
Sec-WebSocket-Protocol: remoteif
Sec-WebSocket-Version: 13

(B)
configuration of base screen  ~51
```
<html>
  <head>
    <script>
      //.JavaScript having following functions
      * start Websocket communication
      * put <div> element of screen data into PageArea
      * receive attribute change message of element to update display
    </script>
  </head>
  <body><div name="PageArea" /></body>
</html>
```

(C)
example of screen data
```
<div id="StartUpPage">
  <button id="button1" width="80" ... />
  <div id="rect1" style="background"... />
  <!-- arrangement information of other components -->
</div>
```

(D)
example of communication command
Read myVar1 myVar2 myVar3 example of communication response
myVar1 = 123
myVar2 = 456
myVar3 = "Hoge"

(E)
example of sent information
Change rect1.height to 456
Change button1.background to black
Change text1.text to "Hoge"

FIG. 10

| component ID | attribute ID | value |
|---|---|---|
| rect1 | heigt | XX |
| | width | YY |
| Button1 | background | black |
| | | white |
| text1 | text | Hoge → TEMP |
| graph1 | Series 1 | (0, 0)···(5, −20) |
| | Series 2 | (0, 10)···(5, −5) |
| Lamp1 | open (0) | red |
| | close (1) | white |
| ⋮ | ⋮ | ⋮ |

FIG. 11

(A)
example of communication command
Write myVar1 = 987 example of communication response
OK (B)
example of sent information
Change rect1. height to 456
Change button1. background to black
Change text1. text to "Hoge"

FIG. 15

(A)
example of communication command
Read myVar1 myVar2 myVar3 example of communication response
myVar1 = 123
myVar2 = 456
myVar3 = "Hoge"

(B)
example of sent information
Change rect1. height to 456
Change button1. background to black
Change text1. text to "Hoge"

FIG. 17 example of point sequence data
point sequence data of graph 1 = {
series 1: (0, 0), (1, 30), (2, 50),
(3, 45), (4, 0), (5, −20),
...
series 2: (0, 10), (1, 15), (2, 0),
(3, 5), (4, 20), (5, −5),
...
FIG. 19
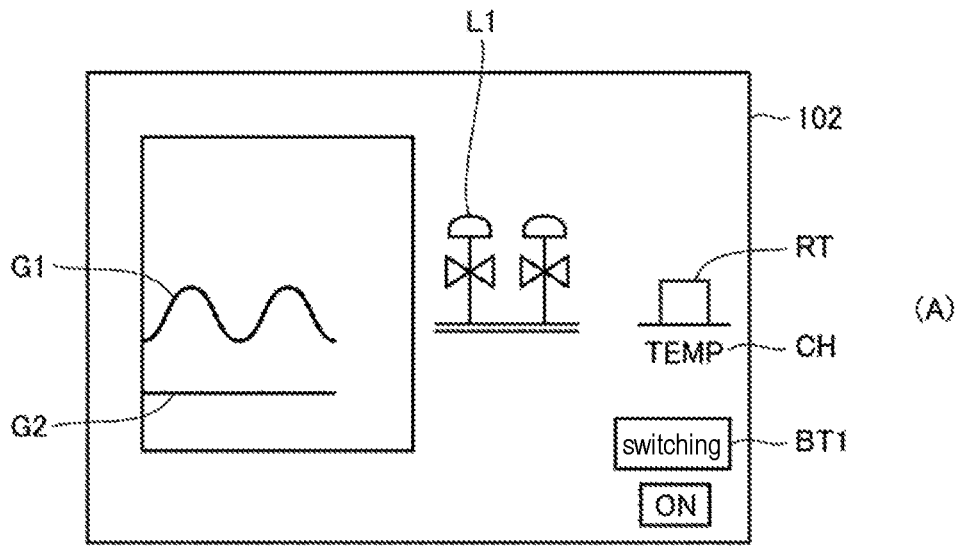
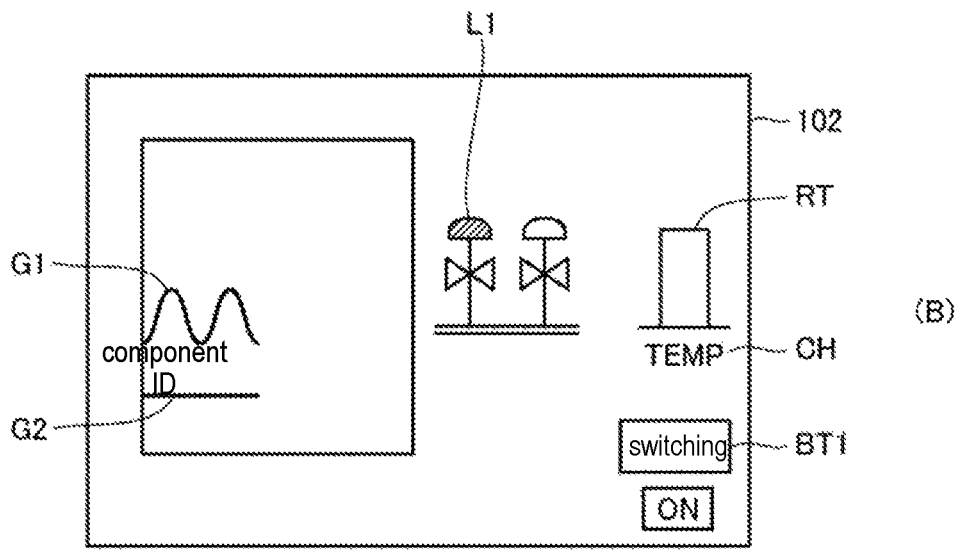
FIG.20

INFORMATION DEVICE, TERMINAL DEVICE AND RECORDING MEDIUM

CROSS-REFERENCE TO RELATED APPLICATION

This application is a 371 application of the International PCT application serial no. PCT/JP2018/033236, filed on Sep. 7, 2018, which claims the priority benefit of Japan Patent Application No. 2017-182922, filed on Sep. 22, 2017. The entirety of each of the abovementioned patent applications is hereby incorporated by reference herein and made a part of this specification.

BACKGROUND OF THE INVENTION

Technical Field

This disclosure relates to an information device for factory automation, a terminal device and a program, and more particularly, to an information device for factory automation that communicates with a terminal device, the terminal device, and a program thereof.

Related Art

A function of remotely monitoring the factory automation is provided by a programmable terminal such as a HMI (Human Machine Interface) to be applied to the field of factory automation. As the monitoring function, a function of displaying information on a factory automation device obtained from a PLC (Programmable Logic Controller) etc. on the programmable terminal, or a function of inputting data for controlling the factory automation device via a screen of the HMI by touch operation of an operator of a production manager is provided.

In general manufacturing sites, technologies of performing reading or operation from a remote place using a network technology have been developed due to demands for labor-saving at manufacturing sites, advances in ICT (Information and Communication Technology) and the like.

For example, Japanese Patent Laid-Open No. 2008-33573 (Patent Literature 1) discloses a configuration that causes a screen displayed on a programmable indicator to be displayed on a device from a remote place, and allows the same operation as the programmable indicator on the displayed screen. More specifically, the programmable indicator of Patent Literature 1 transmits image (image data) of the displayed screen to a plurality of client computers by using a server function of VNC (Virtual Network Computing).

SUMMARY

Problems to be Solved

Since the programmable indicator described in the aforementioned Patent Literature 1 transmits the image (image display) of the displayed screen as it is to a plurality of client computers, an amount of communication between the programmable indicator and the plurality of client computers increases and the communication load rises. If the communication load is high, it takes time to update the screen based on the data from the programmable indicator in each client computer, and there is a risk of impairment of the performance of the remote monitoring function.

Therefore, there is a demand for a configuration for appropriately maintaining the updating performance of the display screen of the terminal device that displays a screen for remotely monitoring an object controlled by the control device.

Means to Solve Problems

According to an aspect of the present disclosure, there is provided an information device for factory automation to be connected to a control device which controls an object. The information device includes a communication unit for communicating with a terminal device having a display capable of displaying a screen for remotely monitoring the control device, and a control unit for controlling the information device.

The screen includes one or more components placed on the screen, and screen data for displaying the screen includes attributes of the respective components relating to display, and a logic executed by the control unit to determine attribute values which are values of the attributes.

In a case where the terminal device displays a screen on the display, the controller unit transmits the attributes and the attribute values of the respective components placed on the screen in the screen data to the terminal device via the communication unit.

Preferably, the control unit acquires the attribute values by executing the logic on the basis of information on the control of the object from the control device.

Preferably, when transmitting the attribute values of the component, the control unit determines whether to transmit the attribute values acquired by execution of the logic to the terminal device, on the basis of the attribute values acquired by execution of the logic of the component and the attribute values of the component being displayed on the display of the terminal device.

Preferably, the case where the terminal device displays a screen on the display includes a case of switching the screen of the display.

Preferably, the case where the terminal device displays a screen on the display includes a case of accepting a user's operation on the component in the screen of the display.

Preferably, the case where the terminal device displays a screen on the display includes a case of changing the attribute values of the component in the screen of the display on the basis of information obtained from the control device or the information device.

Preferably, the logic is different for each component and for each type of user's operation on the component, and in a case where a user operates a component displayed on the display of the terminal device, the control unit executes the logic corresponding to the type of the operation of the component.

Preferably, the terminal device includes a Web application, and the information device communicates with the terminal device by the Web application when a screen is displayed on the display.

According to another aspect of the present disclosure, there is provided a terminal device which communicates with an information device for factory automation to be connected to a control device which controls an object. A terminal device includes a display capable of displaying a screen for remotely monitoring the control device, and a control unit for controlling the terminal device.

The screen includes one or more components placed on the screen. The screen data for displaying the screen includes attributes of the respective components relating to display, and a logic executed by the information device to determine attribute values which are values of the attributes.

In a case where the screen is displayed on the display, the control unit receives the attributes and the attribute values of the respective components placed on the screen in the screen data from the information device.

Preferably, the case of displaying the screen on the display includes a time when an updating notification of the screen is received from the information device.

Preferably, the control unit transmits a notification of an operation content to the information device when accepting the user's operation on the component in the screen of the display, and the control unit receives the updating notification from the information device with respect to the notification of the operation content.

According to still another aspect of the present disclosure, there is provided a program for causing a computer to execute a control method of an information device for factory automation to be connected to a control device which controls an object.

The method includes communicating with a terminal device having a display capable of displaying a screen for remotely monitoring the control device, and controlling the information device. The screen includes one or more components placed on the screen. The screen data for displaying the screen includes attributes of the respective components relating to display, and a logic executed by the control unit to determine attribute values which are values of the attributes.

The controlling includes transmitting the attributes and the attribute values of the respective components placed on the screen in the screen data to the terminal device in the communication, in a case where the terminal device displays the screen on the display.

According to still another aspect of the present disclosure, there is provided a program for causing a computer to execute a control method of a terminal device which communicates with an information device for factory automation. The terminal device is connected to a control device which controls an object.

The terminal device includes a display capable of displaying a screen for remotely monitoring the control device. The screen includes one or more components placed on the screen. The screen data for displaying the screen includes attributes of the respective components relating to the display, and a logic executed by the information device to determine attribute values which are values of the attributes.

The control method includes displaying a screen on the display, and receiving the attributes and the attribute values of the respective components placed on the screen in the screen data from the information device in a case where the screen is displayed.

The information device for factory automation includes at least one of a programmable indicator, an industrial computer, and a calculator.

Effect

According to this disclosure, when the terminal device displays information from the control device to be remotely monitored on the screen of the terminal device, the information device for factory automation transmits the attributes and the attribute values of the respective components, which are a part of the screen data, to the terminal device via the communication unit. Therefore, compared with the case where all the screen data is transmitted, the amount of communication to the terminal device can be reduced. Accordingly, it is possible to prevent the updating performance of the screen of the terminal device from being lowered due to communication load, and to maintain appropriate updating performance.

BRIEF DESCRIPTION OF THE DRAWINGS

FIG. 5 is a diagram showing an example of screen data 61 according to Embodiment 1.

FIG. 6 is a diagram showing an example of screen data 62 according to Embodiment 1 which is transmitted from the programmable indicator 4 to the terminal device 100.

FIG. 7 is a diagram showing an example of data 63 according to Embodiment 1 which is transmitted from the terminal device 100 to the programmable indicator 4.

FIG. 8 is a diagram showing an example of data 64 according to Embodiment 1 which is transmitted from the programmable indicator 4 to the terminal device 100.

FIG. 10 is diagrams of which (A)-(E) show data shown in the communication sequence of FIG. 9.

FIG. 11 is a diagram showing an example of a component table 30 according to Embodiment 1.

FIG. 15 is diagrams of which (A) and (B) show examples of data to be transmitted in the communication sequence of FIG. 14.

FIG. 17 is diagrams of which (A) and (B) show an example of data to be transmitted in the communication sequence of FIG. 16.

FIG. 19 is a diagram showing an example of point sequence data 36 of components (graphs) according to Embodiment 1.

FIG. 20 is a diagram showing an example of a display screen on a display 102 of the terminal device 100.

DESCRIPTION OF THE EMBODIMENTS

Hereinafter, embodiments are described with reference to the drawings. In the following description, the same components and constituent elements are denoted by the same reference signs. The names and functions thereof are also the same. Therefore, detailed description thereof will not be repeated. In this embodiment, a control system including a programmable indicator as an example of an information device for factory automation and a controller as a control device will be described.

Explanation of Terms and Functions

A "HMI program" is an application program that describes one or multiple pages corresponding to a screen to be displayed on a programmable terminal. The screen is displayed when programs of each page of the HMI program are executed.

A "HMI run time" includes various software programs, data or libraries for executing the HMI program.

A "component" refers to an object (a button, an edit box, an image, a diagram, a text, etc.) to be placed on the screen.

"Attributes of component" refer to attributes that define a display state of the component, attributes that define a function (data input/output functions, operation reception functions, etc.) of the component or both attributes.

"Attribute values" are values given to the attributes. The values are indicated by a constant or variable or an expression.

"Screen data" includes one or multiple attributes and a command executed to determine the attribute values of each attribute in association with a component placed on the screen. One or more components are placed on the screen.

Embodiment 1

(Outline)

In Embodiment 1, a programmable indicator connected to a control device (PLC) that controls an object including a factory automation device communicates with a terminal device that remotely monitors the object, and causes a screen to be displayed on the display of the terminal device. When the terminal device displays the screen, the programmable indicator transmits a part of the screen data, that is, the attributes of the components placed on the screen and the attribute values thereof to the terminal device.

Therefore, when the terminal device displays the screen, an amount of communication between the programmable indicator and the terminal device can be reduced as compared with a case of transmitting all screen data as in Patent Literature 1, and it is possible to appropriately maintain the updating performance of the display screen in the terminal device on the basis of the information received from the programmable indicator.

(System Configuration)

Figure 1:
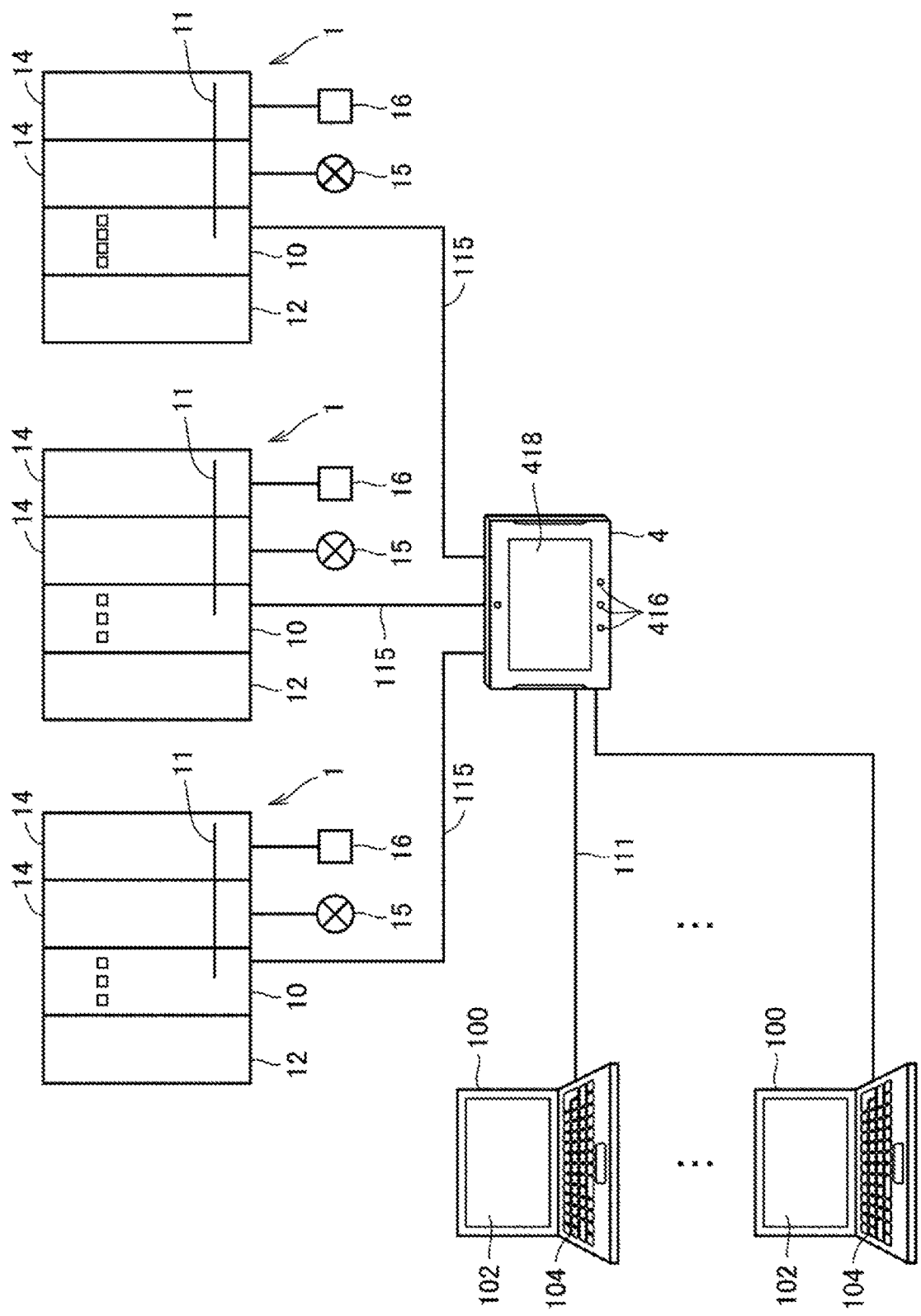
FIG. 1 is a diagram schematically showing a configuration of a system according to Embodiment 1.

FIG. 1 is a diagram schematically showing a configuration of a system according to Embodiment 1. Referring to FIG. 1, the system includes one or more controllers 1, a programmable indicator 4, and one or more terminal devices 100 that are applied to factory automation. The controller 1 is an example of a "control device" that controls an object such as a field device, and is a PLC for example. The programmable indicator 4 is connected to one or multiple controllers 1 via a communication path 115. One or multiple terminal devices 100 can be connected to the programmable indicator 4 via a wired or wireless communication path 111. The communication paths 115 and 111 include, but are not limited to, for example, Ethernet (registered trademark).

The terminal device 100 has a function for a user to remotely monitor an object such as a field device. In Embodiment 1, the terminal device 100 includes, for example, a PC (Personal Computer), but is not limited to a PC. For example, a smart phone, a tablet terminal or the like may be used.

Each controller 1 has the same configuration. The controller 1 typically includes a CPU unit 10 having a CPU (Central Processing Unit) that is a main body for executing a program, a power supply unit 12 that supplies power to the CPU unit 10 or the like, and an I/O unit 14 which exchanges signals with the field device. The IO unit 14 is connected to the CPU unit 10 via the system bus 11. Typically, the IO unit 14 acquires a signal from a detection sensor 15 that is a field device, or drives a relay unit 16 that is a field device depending on the execution result of the program in the CPU unit 10. Moreover, the control object of the controller 1 includes a field device, and the field device is an example of a device related to factory automation, and includes, for example, the detection sensor 15 and relay 16, but the control object is not limited to such a device.

(Configuration of Terminal Device 100)

Figure 2:
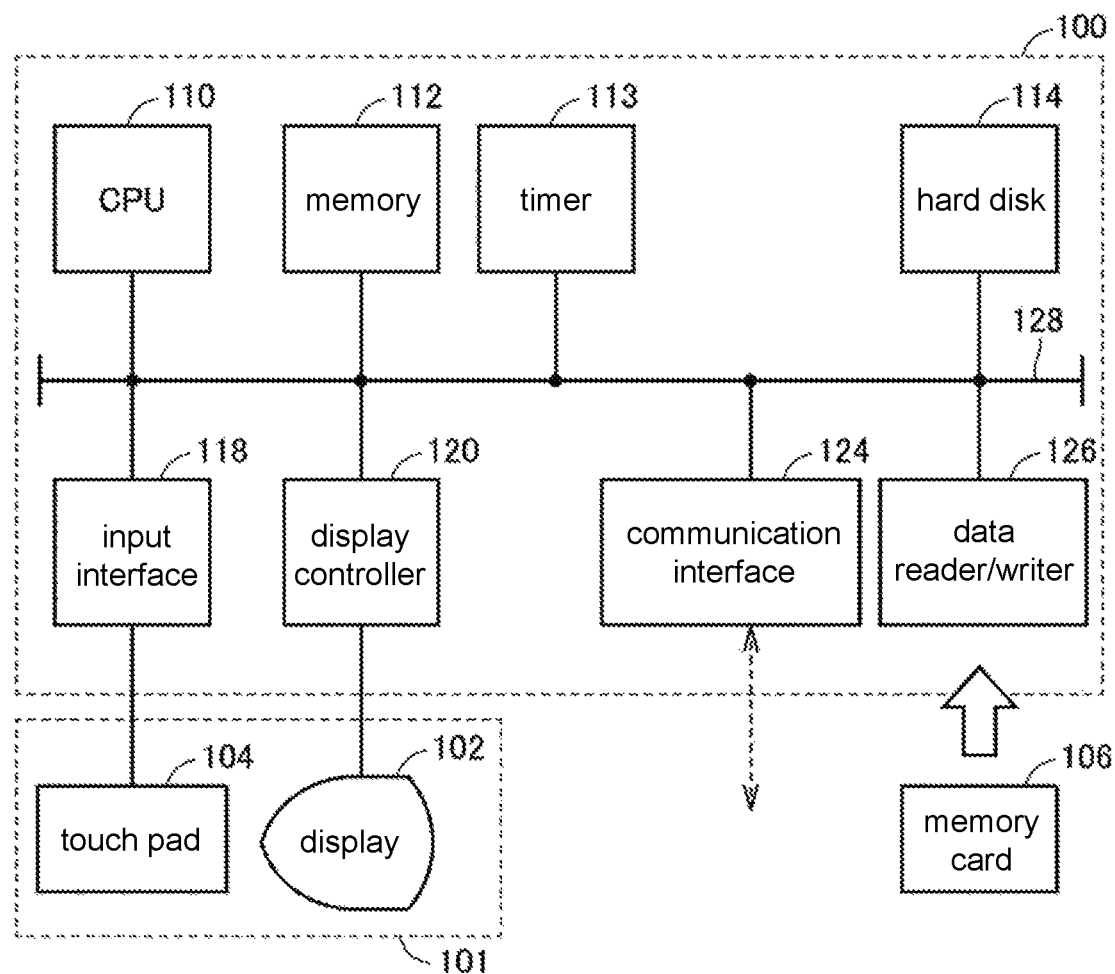
FIG. 2 is a diagram schematically showing a configuration of a terminal device 100 according to Embodiment 1.

FIG. 2 is a diagram schematically showing a configuration of the terminal device 100 according to Embodiment 1. Each terminal device 100 has the same configuration. Referring to FIG. 2, the terminal device 100 includes a CPU 110, a memory 112 and a hard disk 114 serving as a storage unit, a timer 113, an input interface 118, a display controller 120, a communication interface 124, and a data reader/writer 126. The respective units are connected to each other via a bus 128 so that data communication can be performed.

The CPU 110 executes various calculations by executing a program (code) stored in the hard disk 114. The memory 112 is typically a volatile storage device such as a DRAM (Dynamic Random Access Memory). The memory 112 stores data received from the data reader/writer 126, work data, and the like, in addition to the program data read from the hard disk 114.

The input interface 118 mediates data transmission between the CPU 110 and an input device such as a touch pad 104, a mouse (not shown) and a keyboard (not shown). The display controller 120 is connected to a display 102 which is a typical example of a display device, generates a signal for driving the display 102 in accordance with display data, and drives the display 102 by the generated signal. Moreover, the touch pad 104 and the display 102 may be provided as a touch screen 101 configured integrally.

The communication interface 124 includes circuits such as Ethernet and Wi-Fi that mediate data transmission with the programmable indicator 4 via the communication path 111. The data reader/writer 126 mediates data transmission between the CPU 110 and a memory card 106 which is an external storage medium. Further, another output device such as a printer may be connected to the terminal device 100 as necessary.

Moreover, the memory card 106 is distributed in a state in which a program or the like executed by the terminal device 100 is stored, and the data reader/writer 126 reads the program from the memory card 106. The memory card 106 is made up of a general-purpose semiconductor storage device such as a CF (Compact Flash) and a SD (Secure Digital), a magnetic storage medium such as a flexible disk, an optical storage medium such as a CD-ROM (Compact Disk Read Only Memory), or the like.

(Configuration of Programmable Indicator 4)

Figure 3:
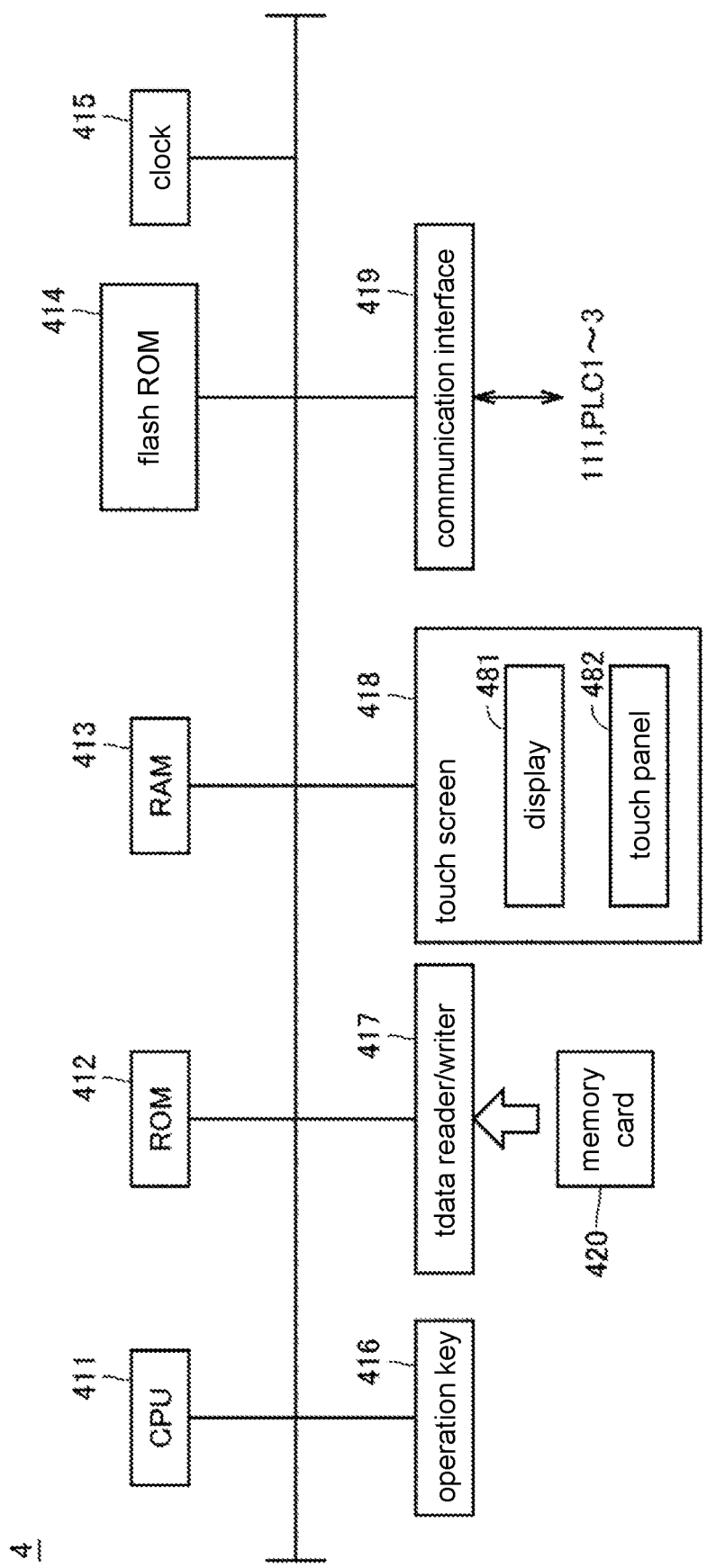
FIG. 3 is a diagram schematically showing a configuration of a programmable indicator 4 according to Embodiment 1.

FIG. 3 is a diagram schematically showing a configuration of the programmable indicator 4 according to Embodiment 1. The programmable indicator 4 is an example of an information device for factory automation connected to a control device (corresponding to the controller 1) that controls an object. When executing each page of the HMI program and displaying the screen, the programmable indicator 4 acquires the values of the variables of each controller 1 or the values stored in the memory from each controller 1 via the communication path 115, and displays the acquired information on the components in the screen. The aforementioned variables or values stored in the memory may be associated with information of the field device (measurement data of the detection sensor 15, sensing data, state data of the relay 16 and the like), in addition to a case where each controller 1 is used as a work memory. Therefore, it is possible to notify the user of the internal state of each controller 1 or information on the field device.

Referring to FIG. 3, the programmable indicator 4 includes a CPU 411 for performing various calculations, a ROM (Read Only Memory) 412, a RAM (Random Access Memory) 413, a flash ROM 414 for storing various programs and data in a nonvolatile manner, a clock 415, an operation key 416 for accepting user's operations, a data reader/writer 417, a touch screen 418, and a communication interface 419. The respective units are connected to each other via an internal bus.

The touch screen 418 includes a display 481 for displaying a screen, and a touch panel 482 for accepting a user's operation on the programmable indicator 4 (more specifically, an operation on the components in the screen). The touch panel 482 is installed to cover the display 481. The display 481 is an example of a "display unit" that displays a screen in which information from the programmable indicator 4 is used. The communication interface 419 is configured to include a circuit such as a modem that communicates with the terminal device 100 and the devices of each controller 1. Another output device such as a printer may be connected to the programmable indicator 4 as necessary.

The data reader/writer 417 mediates data transmission between the CPU 411 and the memory card 420 which is an external storage medium. The memory card 420 can be distributed in a state in which a program or the like executed by the programmable indicator 4 is stored. The data reader/writer 417 reads the program from the memory card 420. The memory card 420 is made up of a general-purpose semiconductor storage device such as a CF (Compact Flash) and a SD (Secure Digital), a magnetic storage medium such as a flexible disk, an optical storage medium such as a CD-ROM (Compact Disk Read Only Memory), or the like.

(Functional Configuration of Programmable Indicator 4 and Terminal Device 100)

Figure 4:
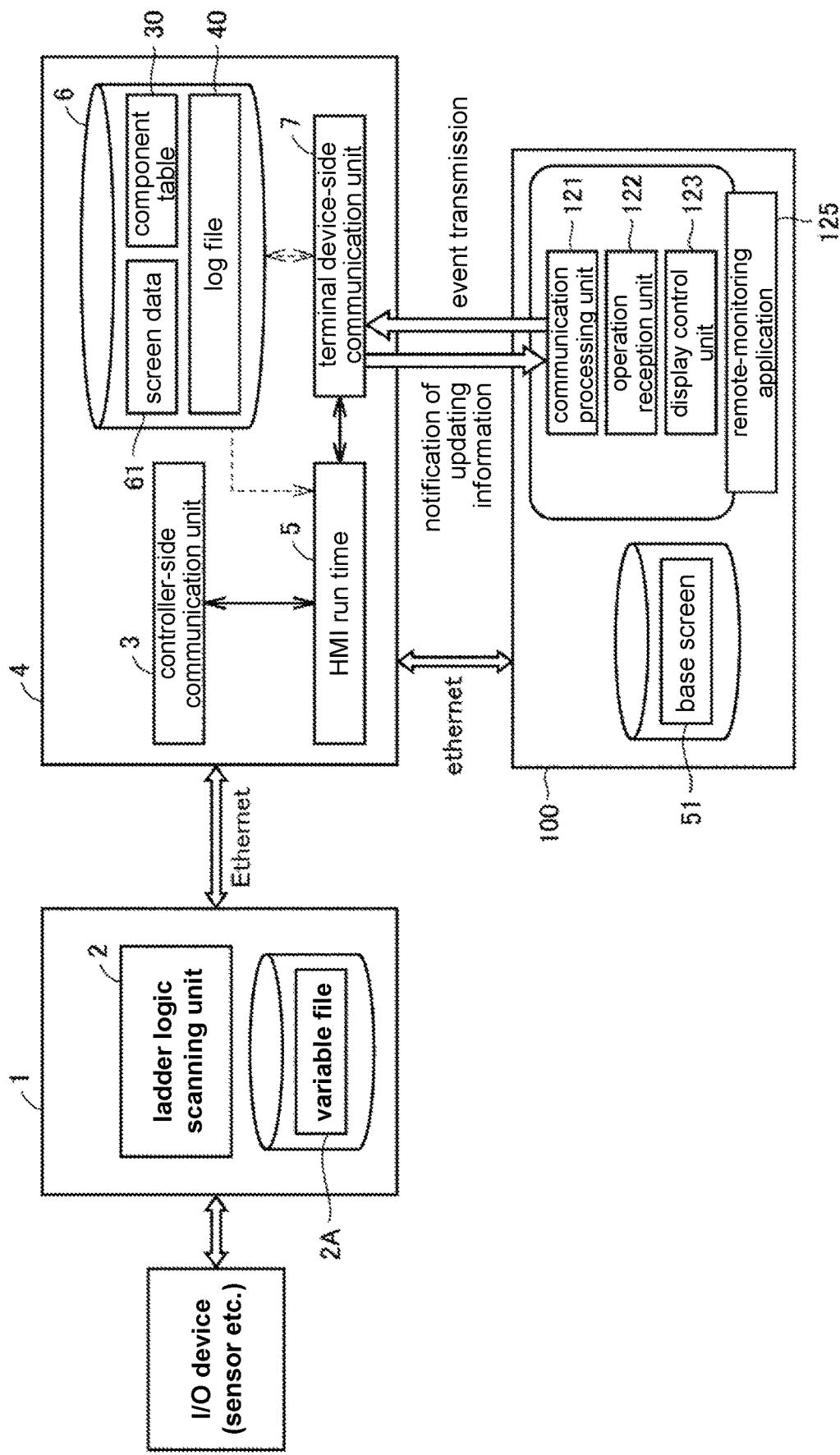
FIG. 4 is a diagram schematically showing a functional configuration of the programmable indicator 4 and the terminal device 100 according to Embodiment 1.

FIG. 4 is a diagram schematically showing a functional configuration of the programmable indicator 4 and the terminal device 100 according to Embodiment 1. Referring to FIG. 4, the controller 1 includes a ladder logic scanning unit 2 for executing ladder logic by which information is acquired from an I/O (input/output) device for the field device or information for controlling the field device is calculated by computation. The ladder logic scanning unit 2 executes ladder logic under the control of the CPU unit 10.

Further, the controller 1 has a variable file 2A for storing information on the control of the field device collected from the I/O device. The variable file 2A stores, for example, output values of each field device and input values which are input to each field device via an I/O device.

The input value or the output value set for each variable of the variable file 2A is called "field value". The input value includes a value which is set to control the field device. The output value includes a value indicating a control result of the field device based on the input value. In the variable file 2A, each of the output value and the input value is set to a corresponding variable.

The programmable indicator 4 includes a controller-side communication unit 3 that controls the communication interface 419 so as to communicate with the controller 1, a terminal device-side communication unit 7 that controls the communication interface 419 so as to communicate with the terminal device 100, and an HMI run time 5 for executing the HMI program. The HMI run time 5 retrieves information from the storage unit 6 when executing the HMI program.

The storage unit 6 stores screen data 61 corresponding to each screen to be displayed on the terminal device 100, a component table 30 indicating information on the components in the screen being displayed on the terminal device 100, and a log file 40 for logging the field value. The storage unit 6 corresponds to a memory unit (e.g., ROM 412, RAM 413, etc.) of the programmable indicator 4. The storage unit 6 is also an example of a "screen storage unit". The controller-side communication unit 3 and the terminal device-side communication unit 7 include a function of generating a transmitting frame according to Ethernet or analyzing the received frame (data extraction from the frame, etc.).

Although the controller-side communication unit 3, the terminal device-side communication unit 7 and the HMI run time 5 are realized as programs executed by the CPU 411, they may also be realized by combination of programs and circuits (ASIC: application specific integrated circuit, FPGA: field-programmable gate array, etc.).

The terminal device 100 has a remote-monitoring application 125 including a communication processing unit 121, an operation reception unit 122, and a display control unit 123. Further, the terminal device 100 stores the base screen data 51 in a memory unit (e.g., the hard disk 114 or the like). The base screen data 51 includes a program for exchanging various types of information with a place holder for displaying the screen data and an information device for factory automation.

The communication processing unit 121 used by the remote-monitoring application 125 includes a function of generating a frame to be transmitted via the communication interface 124 or analyzing the received frame (data extraction from the frame or the like). The operation reception unit 122 receives data based on the user operation contents from the input interface 118, and detects the type of the operation and the operation position from the user operation contents. In the embodiment, the display screen of the display 102 is regarded as a two-dimensional coordinate plane. The operation reception unit 122 acquires the operation position by converting the operation position on the display 102 (more specifically, a screen) into a coordinate position. The display control unit 123 generates display data from the screen data, and outputs the display data to the display controller 120.

Although the communication processing unit 121, the operation reception unit 122, and the display control unit 123 of the terminal device 100 are shown as functions realized by the remote-monitoring application 125 to be executed by the CPU 110 of the terminal device 100, these functions may also be realized by a combination of programs and circuits (ASIC, FPGA, etc.).

(Configuration of Data)

Various data according to Embodiment 1 is described with reference to FIGS. 5 to 8. FIG. 5 is a diagram showing an example of the screen data 61 according to Embodiment 1. FIG. 6 is a diagram showing an example of the screen data 62 according to Embodiment 1 which is transmitted from the programmable indicator 4 to the terminal device 100. FIG. 7 is a diagram showing an example of data 63 according to Embodiment 1 which is transmitted from the terminal device 100 to the programmable indicator 4. FIG. 8 is a diagram showing an example of data 64 according to Embodiment 1 which is transmitted from the programmable indicator 4 to the terminal device 100.

Referring to FIG. 5, the screen data 61 corresponding to each screen stored in the storage unit 6 includes a screen ID 609 which is an identifier of the screen. Further, the screen data 61 includes a component ID 610 for identifying the components, an attribute 611 indicating attributes of the components, an event ID 612 for identifying an event, and a business logic 619 corresponding to each event ID in association with each of the components placed on the screen. The attribute 611 includes an attribute ID corresponding to each of a plurality of types of attributes. The attribute ID includes a type 613 of component, a background color 614 at the time of display, a character color 615 at the time of display, a display position 616 on the screen, a size of display 617, and a text 618. Some components may not have a specific attribute or attribute value. For example, it is shown that a component in which the component ID is Lamp1 does not have the attribute values of character color and text. Further, the screen data 61 stores attribute values in association with each attribute ID of the components.

In the screen data 61, the text screen 618 and the business logic 619 are types of data that are not transmitted from the programmable indicator 4 to the terminal device 100 when a screen is displayed by the terminal device 100. Moreover, the type of the attribute 611 is not limited thereto.

The event ID 612 shows, for example, one or more types of user operations that can be accepted for the component. The types of operation include, but are not limited to, for example, click, release, and press.

The screen data 61 includes business logic 619 for each component (component ID 610) and for each type of operation (event ID 612) performed on the component. When a certain event ID 612 is detected, the CPU 411 (more specifically, the HMI run time 5) executes the business logic 619 corresponding to the event ID 612. The business logic 619 includes a logic (e.g., program code) for exchanging information with the control device, a computation logic using the information (e.g., program code), a logic (e.g., program code) for controlling display of corresponding components or a logic (e.g., a program code) for controlling display of the component depending on the type of the operation performed on the component.

Referring to FIG. 6, the screen data 62 is made up of partial data obtained by excluding attributes (text 618) that are not transmitted to the terminal device 100 and the business logic 619 from the screen data 61 of FIG. 5.

Referring to FIG. 7, data 63 is transmitted from terminal device 100 to the programmable indicator 4 when the components on the screen of the terminal device 100 are operated. The data 63 includes a screen ID 609 of the screen of the operated component, a component ID 610 of the component, and an event ID 612 indicating the type of the operation performed.

Referring to FIG. 8, when the HMI run time 5 of the programmable indicator 4 executes the business logic 619 associated with the component ID 610 of the screen, the data 64 includes the screen ID 609 of the screen, the component ID 610, the attribute ID 61A obtained by the execution and the attribute value 61B thereof.

(Communication Sequence and Various Data for Screen Display)

A screen display process, a switching process of the display screen, a writing process of variables, a monitoring process, and a graph display process based on log information (logged information) executed at the startup of the terminal device 100 are described according to the communication sequence between the terminal device 100, the programmable indicator 4, and the controller 1.

Moreover, when the communication sequence is executed, the programmable indicator 4 performs the display process of the screen for remotely monitoring the field device on the display 481. Since the same process as that conventionally proposed can be applied as this display process, the description thereof is not repeated here.

<Communication Sequence at Time of Startup>

Figure 9:
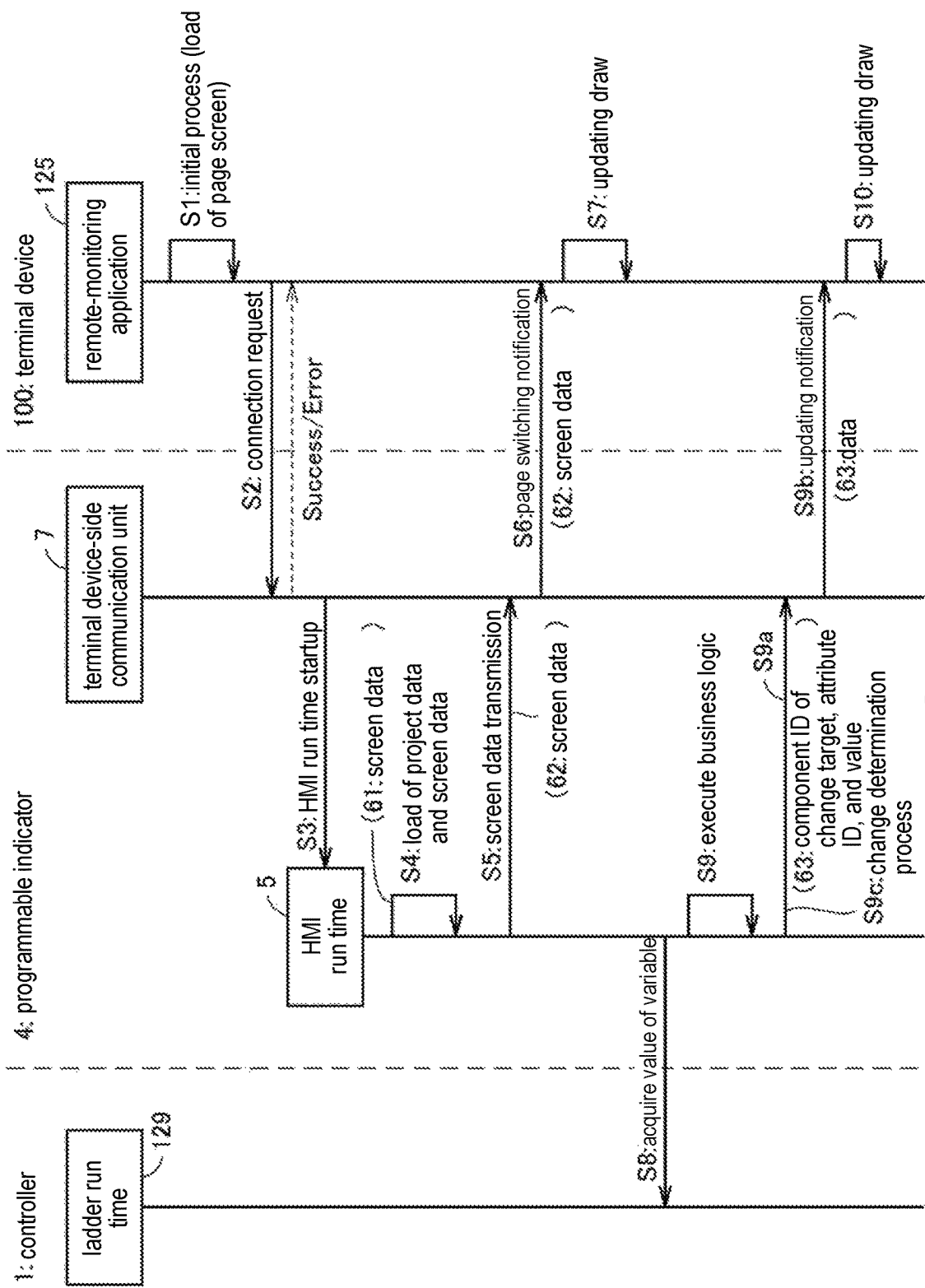
FIG. 9 is a diagram showing an example of a communication sequence at the startup of the terminal device 100 according to Embodiment 1.

FIG. 9 is a diagram showing an example of a communication sequence at the startup of the terminal device 100 according to Embodiment 1. Referring to FIG. 9, first, when the remote-monitoring application 125 is started up in the terminal device 100, the remote-monitoring application 125 performs an initial process (step S1). In the initial process, the remote-monitoring application 125 loads the base screen data 51 into the memory 112 (step S1).

When the terminal device 100 is started up, the communication processing unit 121 of the remote-monitoring application 125 transmits a connection request to the programmable indicator 4, and the terminal device-side communication unit 7 of the programmable indicator 4 transmits a response (success or error of connection) to the terminal device 100 (step S2). The connection is made, for example, by communication according to a HTTP (Hypertext Transfer Protocol). Here, it is assumed that the connection is successful.

In the programmable indicator 4, the terminal device-side communication unit 7 outputs a startup command to the HMI run time 5 when receiving the connection request (step S3). When the HMI run time 5 is started up, the HMI run time 5 loads the project data, and retrieves and loads, from the storage unit 6, the screen data 61 corresponding to the screen ID 609 at the startup of the terminal device 100 (step S4). The HMI run time 5 extracts screen data 62, which is partial data to be transmitted to the terminal device 100, from the loaded screen data 61. The screen data 62 includes the screen ID 609 and data of one or more components to be placed on the base screen.

The terminal device-side communication unit 7 transmits the screen data 62 to the terminal device 100 together with the page switching notification (steps S5 and S6). After step S6, the programmable indicator 4 and the terminal device 100 communicate with each other according to, for example, a WebSocket protocol.

Upon reception of the page switching notification, the remote-monitoring application 125 of the terminal device 100 generates display data for displaying a screen in which components are placed on the base screen in accordance with the base screen data 51 and the screen data 62 (the type of attributes and the attribute values of each component) from the programmable indicator 4, and outputs the generated display data to the display controller 120. The display controller 120 drives the display 102 in accordance with the display data. Accordingly, a screen at the startup is drawn on the display 102 (step S7).

Further, the remote-monitoring application 125 stores the screen data 62 from the programmable indicator 4 in the memory 112 or the like so as to hold the screen data 62 of the screen being displayed on the display 102.

In addition, in the programmable indicator 4, the HMI run time 5 transmits a request for obtaining values of various variables to the controller 1 (step S8). The ladder run time 129 of the controller 1 reads the values of requested variables from the variable file 2A and transmits the values to the programmable indicator 4. The HMI run time 5 executes the business logic 619 of each component of the screen data 61 of the screen being displayed on the programmable indicator 4 (in this case, the screen at the startup), on the basis of the values of the variables received from the controller 1 (step S9).

The HMI run time 5 determines, on the basis of the attribute values of each component in the screen at the startup obtained by the business logic execution, the component for which the attribute values should be updated, among the components in the screen being displayed on the programmable indicator 4 (step S9c). This determination is referred to as a "change determination process". Details of the change determination process will be described later.

The HMI run time 5 generates data 63 and transmits the data 63 to the terminal device 100 together with the updating notification (steps S9a and S9b). The data 63 includes the component ID and the attribute ID of each component determined in the change determination process, and the attribute value acquired in step S9.

The remote-monitoring application 125 of the terminal device 100 updates the attribute values of the components on the startup screen of the display 102 in accordance with the updating notification received from the programmable indicator 4 (step S10). At the time of updating this screen, on the basis of the base screen data 51 and the data 63 (the component ID, the attribute ID and the attribute value) received together with the updating notification, the remote-monitoring application 125 generates display data for changing the attribute values (display state, etc.) of the corresponding components on the startup screen, and outputs the display data to the display controller 120. Accordingly, each component on the startup screen of the display 102 can display a display state according to the latest field value.

In the communication sequence at the startup of the terminal device 100 described above, when the terminal device 100 displays the startup screen, the programmable indicator 4 transmits the screen data 62 which is a part the screen data 61 of the startup screen rather than transmitting all the screen data 61 (step S6). Therefore, it is possible to reduce the amount of communication between the programmable indicator 4 and the terminal device 100 as compared with the case of transmitting all the screen data 61.

FIG. 10 is diagrams of which (A) to (E) illustrate the data shown in the communication sequence of FIG. 9. (A) of FIG. 10 shows a HTTP request included in the connection request (step S2) of FIG. 9. (B) of FIG. 10 shows the base screen data 51 loaded in the process of FIG. 9 (step S1). The base screen data 51 has a command of the connection request (step S2), a script command for placing each component on the base screen in accordance with the component ID, the attribute ID, the attribute value, and the like.

In step S7 of FIG. 9, the remote-monitoring application 125 executes the script command of the base screen data 51 in accordance with the data from the programmable indicator 4 (the component ID, the attribute ID and the attribute value of each component). Thereby, each component is displayed on the base screen in accordance with the display state indicated by the attribute value thereof.

(C) of FIG. 10 shows an example of the screen data 61 loaded in the process of FIG. 9 (step S4). The screen data 61 does not include commands or programs, and the contents shown in FIG. 5 are described in accordance with HTML (HyperText Markup Language).

(D) of FIG. 10 shows communication commands of request and response of acquisition of the variable values in the process of FIG. 9 (step S8). The command (Read) of the acquisition request includes types of variables (e.g., myVar1, myVar2, and myVar3). The response from the controller 1 to the acquisition request of the variable indicates a field value for each of the requested variables (myVar1 to myVar3).

(E) of FIG. 10 shows an example of data 63 to be transmitted together with the updating notification (step S9b). The data 63 is made up of, for example, a change command (Change), a component ID of the component to be changed (rect, button1, text1), an attribute ID to be changed corresponding to each component (height, background, text), and attribute values after change (456, Black, "Hoge"), for components that require the change in attribute value.

In step S9 of FIG. 9, the remote-monitoring application 125 executes the script command of the base screen data 51 in accordance with the data 63 from the programmable indicator 4. Thereby, each component is displayed on the display screen of the programmable indicator 4 in accordance with the display state indicated by the attribute value according to the field value.

(Change Determination Process)

By performing the change determination process (step S9c), it is possible to reduce the amount of communication between the programmable indicator 4 and the terminal device 100.

In the change determination process, the component table 30 is retrieved. FIG. 11 is a diagram showing an example of the component table 30 according to Embodiment 1. The HMI run time 5 manages, by the component table 30, the attribute values of the component in the screen being displayed on the terminal device 100. Referring to FIG. 11, the component table 30 stores component ID 31, attribute ID 32, and attribute values 33 thereof (values being displayed) in association with each component on the screen being displayed on the terminal device 100. The HMI run time 5 manages (updates) the component table 30 so as to indicate the attribute values of the respective components on the screen being displayed on the terminal device 100.

In the change determination process, the HMI run time 5 compares the attribute values of the respective components obtained by execution of the business logic 619 based on the field value of the variables acquired from the controller 1 with the attribute values 33 of the corresponding component of the component table 30. When a determination that both attribute values are different from each other is made on the basis of the comparison result, the HMI run time 5 transmits the updating notification via the terminal device-side communication unit 7 (step S9b). On the other hand, when a determination that both attribute values are the same as each other is made as a result of the comparison, the HMI run time 5 does not transmit the updating notification in step S9b.

Therefore, only when a change is detected in the attribute values of the components based on the field value, the data 63 of the component with the changed attribute value is transmitted from the programmable indicator 4 to the terminal device 100. Thereby, the amount of communication between the programmable indicator 4 and the terminal device 100 can be further reduced.

<Communication Sequence at Screen Switching>

Figure 12:
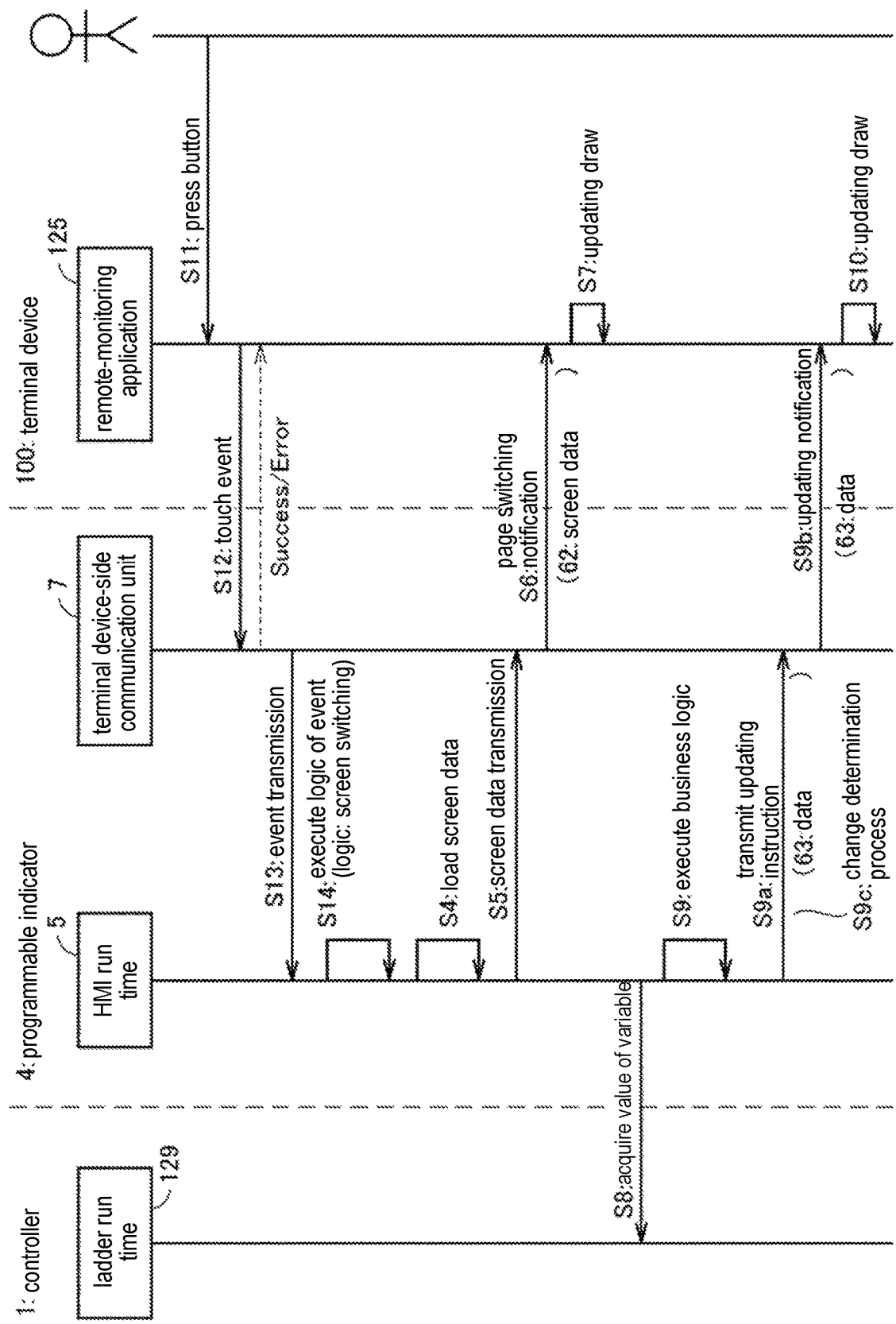
FIG. 12 is a diagram showing an example of a communication sequence at the screen switching according to Embodiment 1.

FIG. 12 is a diagram showing an example of a communication sequence at the screen switching according to Embodiment 1. In FIG. 12, the programmable indicator 4 and the terminal device 100 communicate with each other in accordance with, for example, the WebSocket protocol.

Referring to FIG. 12, when the user operates a screen switching button (component) of the terminal device 100 (step S11), the sequence is started. Moreover, the type of operation is not limited to a touch operation.

The remote-monitoring application 125 retrieves the screen data 62 based on the operation contents, and generates and transmits a touch event (e.g., 'button 1, click') based on the retrieval (step S12). Specifically, the remote-monitoring application 125 generates and transmits the touch event, when a determination that the event ID associated with the operated component indicates the type of the accepted operation, on the basis of the retrieval of the screen data 62.

The terminal device-side communication unit 7 of the programmable indicator 4 receives the touch event from the terminal device 100, and transmits the received touch event to the HMI run time 5 (step S13).

The HMI run time 5 retrieves the screen data 61 based on the touch event, and executes the business logic 619 associated with the touch event based on the retrieval (step S14). Here, the business logic 619 for switching to a new screen is executed. Since the processes after FIG. 12 (steps S4 to S10) are the same as the processes of steps S4 to S10 of FIG. 9, the description thereof will not be repeated.

Therefore, at the time of the screen switching of the terminal device 100 described above, the programmable indicator 4 does not transmit all the screen data 61 but transmits the screen data 62 that is a part of the screen data 61 (step S6). In addition, the change determination process (step S9c) is also performed in the same manner. Therefore, even in the communication sequence at the screen switching, it is possible to reduce the amount of communication between the programmable indicator 4 and the terminal device 100 as in the case of the screen display at the startup.

<Switching Process of Display Screen Including Necessity Determination of Screen Data>

Figure 13:
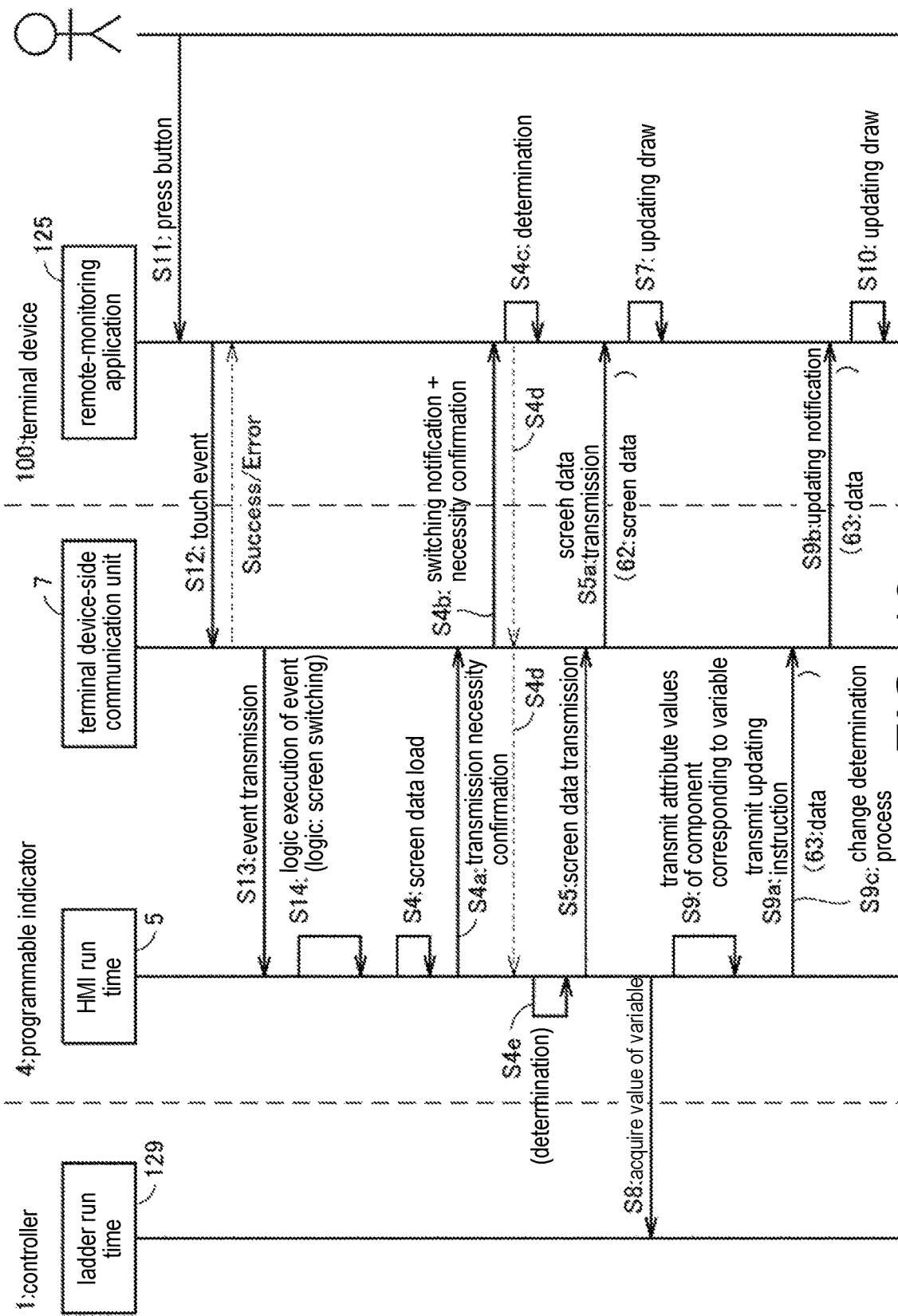
FIG. 13 is a diagram showing another example of the communication sequence of a switching process of the display screen of the terminal device 100 according to Embodiment 1.

FIG. 13 is a diagram showing another example of a communication sequence of the switching process of the display screen of the terminal device 100 according to Embodiment 1. In FIG. 13, the programmable indicator 4 and the terminal device 100 communicate with each other in accordance with, for example, the WebSocket protocol. The communication sequence of FIG. 13 adds processes (steps S4a to S4e and S5a) relating to the transmission necessity of the screen data 62 to the communication sequence of FIG. 12. Since other processes of FIG. 13 are the same as those of FIG. 12, the description thereof will not be repeated.

In the additional processes (steps S4a to S4e and S5a), when a determination that the terminal device 100 holds the screen data 62 of the screen after switching is made, the HMI run time 5 of the programmable indicator 4 does not transmit the screen data 62 to the terminal device 100.

Referring to FIG. 13, when the screen data 61 is loaded (step S4), the HMI run time 5 of the programmable indicator 4 transmits the transmission necessity confirmation to the terminal device-side communication unit 7 (step S4a). The transmission necessity confirmation includes an inquiry as to whether the screen data 62 that is a part of the loaded screen data 61 needs to be transmitted to the terminal device 100. The necessity confirmation includes the screen ID 609 of the screen of the switching destination.

The terminal device-side communication unit 7 transmits the necessity confirmation together with the switching notification to the terminal device 100 in accordance with the necessity confirmation from the HMI run time 5 (step S4b).

The remote-monitoring application 125 of the terminal device 100 retrieves the storage unit (the memory 112, etc.) based on the screen ID 609 indicated by the necessity confirmation in accordance with the necessity confirmation, and determines, from the retrieval result, whether the screen data 62 of the screen of switching destination is stored (step S4c).

The remote-monitoring application 125 transmits a response indicating the determination result of step S4c to the programmable indicator 4 (step S4d). The HMI run time 5 of the programmable indicator 4 receives the response via the terminal device-side communication unit 7, and determines the necessity of transmission of the screen data 62 of the screen of switching destination based on the determination result indicated by the response (step S4e).

When determining that the transmission is necessary, the HMI run time 5 transmits the screen data 62 to the terminal device 100 via the terminal device-side communication unit 7 (steps S5 and S5a). However, when determining that the transmission is not necessary, the HMI run time 5 does not transmit the screen data 62 to the terminal device 100 via the terminal device-side communication unit 7.

When the screen data 62 of the screen of switching destination can be retrieved in step S4c, the remote-monitoring application 125 of the terminal device 100 draws the screen of the switching destination on the display 102 on the basis of the screen data 62 read from the storage unit. On the other hand, when the screen data 62 of the screen of switching destination cannot be retrieved (that is, the screen data 62 is not stored in the storage unit), the remote-monitoring application 125 receives the screen data 62 from the programmable indicator 4, and draws the screen of switching destination on the display 102 by using the received screen data 62.

According to the communication sequence of FIG. 13, when the terminal device 100 has the screen data 62 of the screen of switching destination at the time of switching of the display screen of the terminal device 100, the programmable indicator 4 does not transmit the screen data 62 to the terminal device 100. In addition, the change determination process (step S9c) is also performed in the same manner as described above. Therefore, it is possible to reduce the amount of communication between the programmable indicator 4 and the terminal device 100.

<Writing Process>

Figure 14:
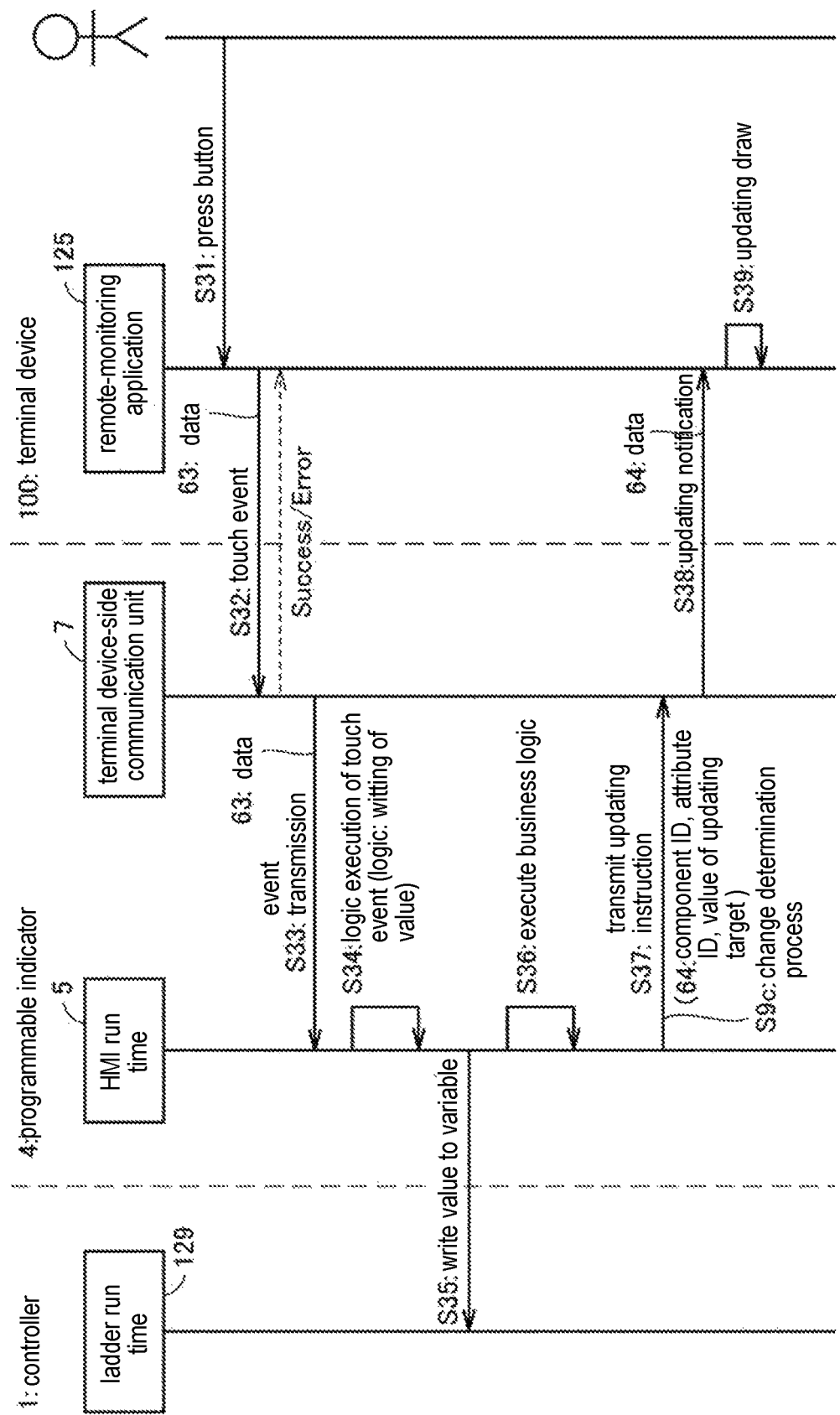
FIG. 14 is a diagram showing an example of a communication sequence of a writing process to a variable according to Embodiment 1.

FIG. 14 is a diagram showing an example of a communication sequence of a writing process to the variable according to Embodiment 1. In FIG. 14, the programmable indicator 4 and the terminal device 100 communicate with each other in accordance with, for example, the Web Socket protocol. FIG. 15 is diagrams of which (A) and (B) show an example of data to be transmitted in the communication sequence of FIG. 14.

First, when a user of the terminal device 100 operates a button on the screen (step S31), the remote-monitoring application 125 transmits data 63 indicating the corresponding event ID to the programmable indicator 4 (step S32).

The terminal device-side communication unit 7 of the programmable indicator 4 receives the data 63 from the terminal device 100 and transmits the data 63 to the HMI run time 5 (step S33). The HMI run time 5 specifies the screen data 61 of the screen being displayed on the terminal device 100 on the basis of the data 63, and executes the business logic 619 corresponding to the specified screen data 61 (step S34). As a result of the execution, the HMI run time 5 performs a process of writing values on one or more variables of the variable file 2A (step S35).

In step S34, the HMI run time 5 generates a write command (e.g. 'Write myVar1=987') of (A) in FIG. 15 by the execution of the business logic 619, and transmits the write command to the controller 1. The controller 1 executes the write command and returns a response. Accordingly, the field value of the variable myVar1 of the variable file 2A is rewritten to 987.

The HMI run time 5 executes the business logic 619 on the basis of the field value of the written variable myVar1 (step S36). Thereafter, the HMI run time 5 performs the change determination process (step 9c). When the attribute values of the components change, the HMI run time 5 generates data 64 for updating the display of the terminal device, and transmits the data 64 together with the updating notification to the terminal device 100 via the terminal device-side communication unit 7 (steps S37 and S38). (B) of FIG. 15 shows a specific example of the data 64 transmitted in step S38.

The remote-monitoring application 125 of the terminal device 100 updates the screen of the display 102 in accordance with the updating notification and the data 64 from the programmable indicator 4 (step S39).

In the communication sequence for writing values on the variables of the aforementioned variable file 2A, in order to display the screen on the terminal device 100, the programmable indicator 4 transmits, to the terminal device 100, not all the screen data 61 (or screen data 62) but only the attribute values of the components changed due to the execution of the business logic 619 or due to other causes (step S37). Therefore, it is possible to reduce the amount of communication between the programmable indicator 4 and the terminal device 100 as compared with the case of transmitting all the screen data 61 (or screen data 62).

In addition, in step S37, if the aforementioned change determination process (step 9c) is performed and a determination is made that the attribute values of the components need to be changed, the programmable indicator 4 transmits the data 64 to the terminal device 100. Accordingly, the amount of communication can be further reduced.

<Monitoring Process>

Figure 16:
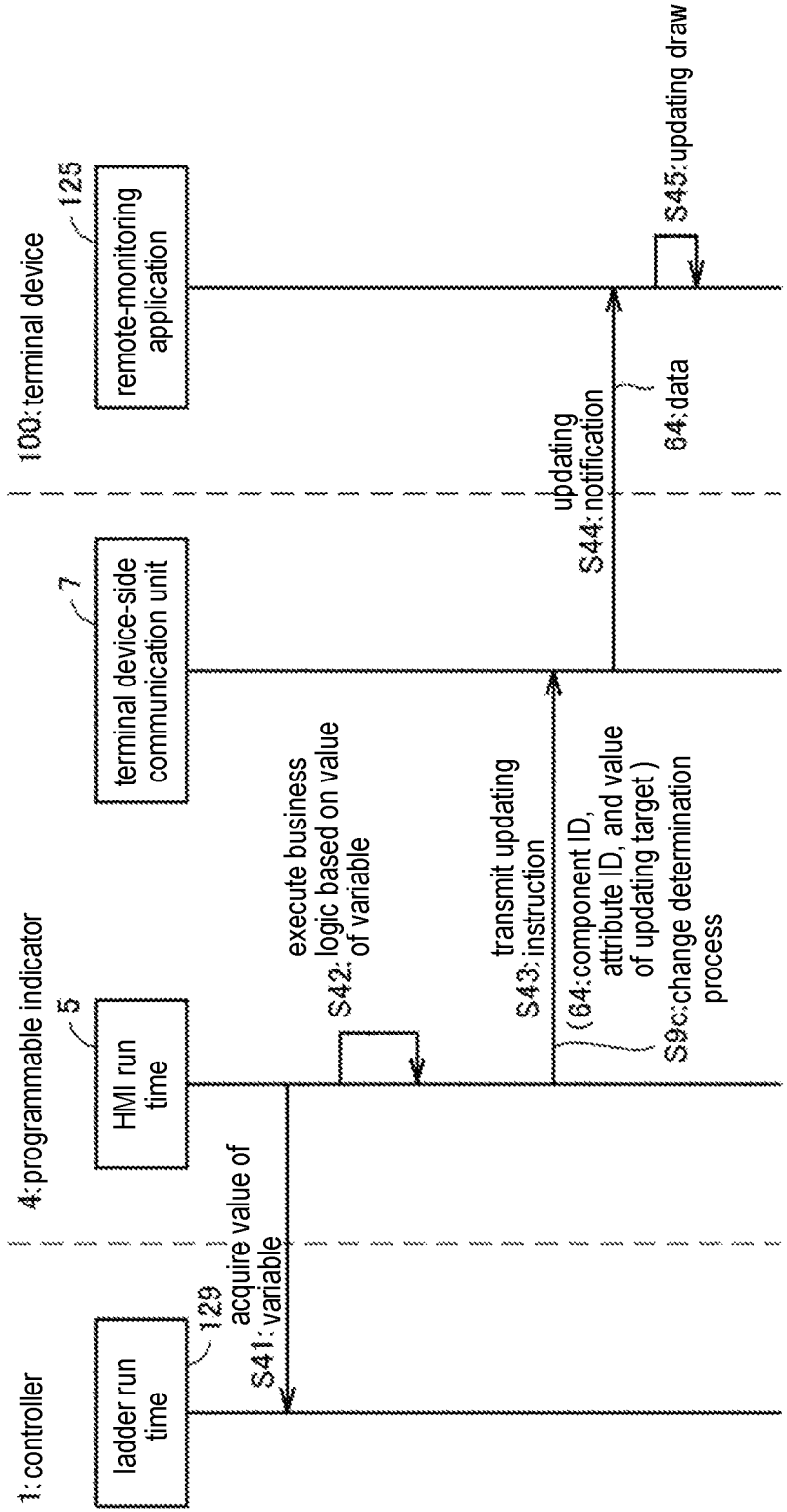
FIG. 16 is a diagram showing an example of a communication sequence of a monitoring process according to Embodiment 1.

FIG. 16 is a diagram showing an example of a communication sequence of the monitoring process according to Embodiment 1. In FIG. 16, the programmable indicator 4 and the terminal device 100 communicate with each other in accordance with, for example, the WebSocket protocol. FIG. 17 is diagrams of which (A) and (B) show an example of data to be transmitted in the communication sequence of FIG. 16. The monitoring process is repeatedly performed so that the attribute values of the components of the screen being displayed on the terminal device 100 can represent a value based on the latest field value. A repetition interval is not limited to every fixed time, every variable time, or the like. In the monitoring process, the HMI run time 5 transmits a list of variables to the controller 1 in advance, and when the values of the variables described in the list of variables change, the controller 1 may transmit the change to the HMI run time 5.

First, it is assumed that a certain screen is being displayed on the display 102 of the terminal device 100. When the communication sequence is started, the HMI run time 5 retrieves the variable file 2A and acquires field values of a plurality of variables (step S41). Specifically, the HMI run time 5 transmits the communication command in (A) of FIG. 17 to the controller 1 and receives a response. The response includes the field values of the variables which are read from the variable file 2A by the ladder run time 129 on the basis of the communication command.

The HMI run time 5 executes the business logic 619 of the screen data 61 of the screen being displayed on the terminal device 100 on the basis of the acquired field values of the variables (step S42). The HMI run time 5 generates data 64 by the execution, and transmits the generated data 64 together with the updating notification to the terminal device 100 via the terminal device-side communication unit 7 (steps S43 and S44). (B) of FIG. 17 shows a specific example of the data 64 transmitted in step S44.

In step 43, the HMI run time 5 performs the change determination process (step S9c). Therefore, the programmable indicator 4 transmits, to the terminal device 100, only the data 64 indicating the attribute value of the component determined to need a change.

The remote-monitoring application 125 of the terminal device 100 draws so as to update the screen being displayed on the display 102 on the basis of the data 64 in accordance with the updating notification (step S45). Thereby, the attribute value of the component on the screen is updated so as to indicate the attribute value acquired after the value is written on the variable.

In the aforementioned communication sequence of the monitoring process, the programmable indicator 4 transmits not all the screen data 61 of the screen but only the data 64 including the attribute value of the component to the terminal device 100. Therefore, it is possible to reduce the amount of communication between the programmable indicator 4 and the terminal device 100 as compared with the case of transmitting all the screen data 61.

In addition, in step S43, the programmable indicator 4 performs the change determination process (step 9c), and transmits, as the data 64, only the attribute value of the component determined to need a change among the attribute values of the component to the terminal device 100. Therefore, it is possible to further reduce the amount of communication.

<Communication Sequence for Graph Display Process>

Figure 18:
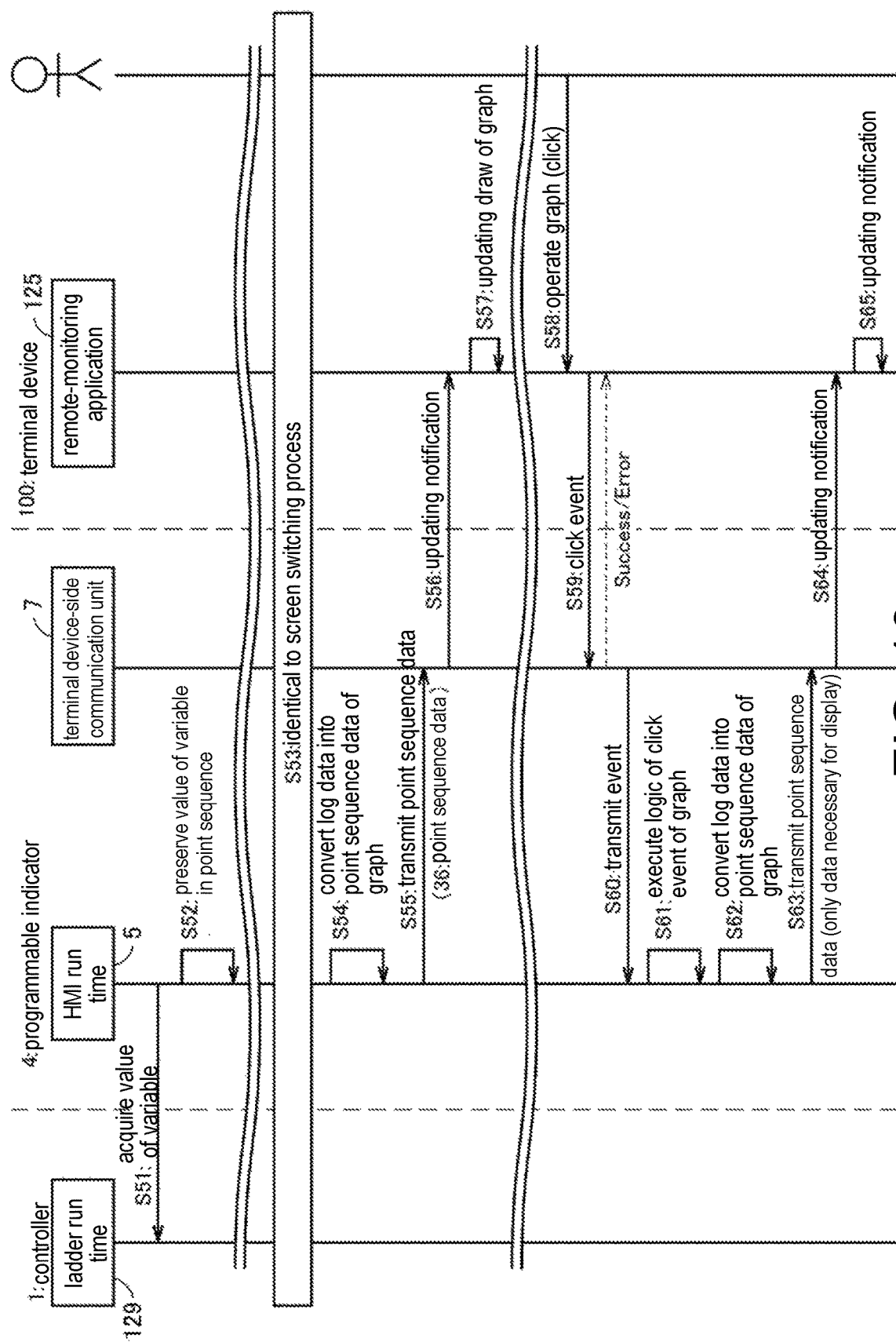
FIG. 18 is a diagram showing an example of a communication sequence for a graph display process according to Embodiment 1.

FIG. 18 is a diagram showing an example of a communication sequence for the graph display process according to Embodiment 1. In FIG. 18, the programmable indicator 4 and the terminal device 100 communicate with each other in accordance with, for example, the Web Socket protocol. In Embodiment 1, the components of the screen data 61 may include a graph. The HMI run time 5 acquires field values of one or multiple variables from the ladder run time 129 to acquire time series data (hereinafter referred to as log data) of the graph (step S51).

When the HMI run time 5 reads the field values from the variable file 2A via the ladder run time 129 at constant periods or for each event, and stores (accumulates) the field values in the log file 40 in time series according to the reading order, the log data is generated accordingly (step S52). The event may include a time at which a predetermined conditional expression is satisfied, a time at which an event due to a user operation is received from the terminal device 100, or the like. In Embodiment 1, this constant period or conditional expression can be set variably. Information on the set period and conditional expression is loaded into the storage unit (RAM 413 or the like) of the programmable indicator 4 when the HMI run time 5 is started up.

Thereafter, a screen switching process is performed. Since this process is the same as the communication sequence (FIG. 12 or FIG. 13) for the aforementioned screen switching, detailed description thereof will not be repeated.

When the screen switching process is performed, the HMI run time 5 reads log data for a component (graph) included in the screen after switching from the log file 40. The HMI run time 5 executes the business logic 619 on the basis of the read log data and attribute 611 of the component of the graph of the screen data 61, and converts the log data into point sequence data of the coordinate system by the execution (step S54). By executing the business logic 619, the point sequence data 36 includes only time-series data of a length necessary for displaying the components of graph on the screen of the terminal device 100.

The HMI run time 5 transmits the attribute value (point sequence data 36 of the graph) of the graph component to the terminal device 100 together with the updating notification via the terminal device-side communication unit 7 (steps S55 and S56).

The remote-monitoring application 125 of the terminal device 100 displays a screen so as to update the value of the graph on the basis of the point sequence data 36 from the programmable indicator 4 (step S57).

Accordingly, when the screen is switched, the graph of the screen after the switching indicates a change according to the time series of the latest field values logged (accumulated) in the log file 40.

Next, a communication sequence when the user operates a graph (component) on the screen is described. The operation is, for example, a click operation.

The remote-monitoring application 125 reads the event ID 612 from the screen data 62 based on the operation content, and transmits a click event notification including the event ID 612 to the programmable indicator 4 (steps S58 and S59).

The terminal device-side communication unit 7 transmits the click event notification from the terminal device 100 to the HMI run time 5 (step S60). The HMI run time 5 executes the business logic 619 of the screen data 61 associated with the event ID 612 of the click event notification from the terminal device 100 (step S61). Thereby, the log data is acquired from the log file 40, and the acquired log data is converted into the point sequence data 36 (steps S61 and S62).

The HMI run time 5 transmits the attribute value of component (point sequence data 36 of the graph) together with the updating notification to the terminal device 100 via the terminal device-side communication unit 7 (steps S63 and S64).

The remote-monitoring application 125 of the terminal device 100 updates the graph of the screen on the basis of the attribute values of the component (point sequence data 36 of the graph) in accordance with the received updating notification (step S65). In this way, each time a graph on the screen is clicked, the graph is updated in accordance with the latest log data.

FIG. 19 is a diagram showing an example of the point sequence data 36 of the component (graph) according to Embodiment 1. The point sequence data 36 of FIG. 19 includes, for example, point sequence data 36 of a graph of series 1 and a graph of series 2.

The type of operation content (event ID 612) that can be accepted for the graph (component) on the screen is not limited to the click operation for updating the time-series data of the graph. For example, a pinch operation or a swipe operation on the graph may be performed. In the case of the pinch operation, if a pinch-in is performed, the business logic 619 for downsizing the graph is executed (step S61). If a pinch-out is performed, the business logic 619 for enlarging the graph is executed (step S61). Further, if a scroll operation is performed, the business logic 619 for scrolling the graph is executed (step S61).

(Display Example of Screen)

FIG. 20 is a diagram showing an example of a display screen on the display 102 of the terminal device 100. (A) of FIG. 20 includes a graph G1 (G2) of time-series, a lamp L1, a bar graph RT, a button BT1, and a character string CH as components of the screen. The lamp L1 indicates, for example, open/closed states of a valve as a field value. The graph RT indicates, for example, a measured value of a temperature sensor as the field value. The character string CH indicates the name (TEMP) of the attribute value (temperature) of the graph RT. The button BT1 corresponds to an icon operated by the user to switch the screen.

When the aforementioned monitoring process is performed and the screen is switched during display of the screen of (A) in FIG. 20, on the screen after the switching of (B) in FIG. 20, for example, the lamp L1 indicates the updated attribute (closed state of the valve), and the graph RT indicates the updated attribute value (increased temperature). In addition, when the pinch-in operation is performed on the graphs G1 and G2 in (A) of FIG. 20, the graphs G1 and G2 are downsized as shown in (B) of FIG. 20. The number of components, the types and attribute values of the respective components on the screen of FIG. 20 are examples, and the present invention is not limited thereto.

Modification Example of First Embodiment

Figure 21:
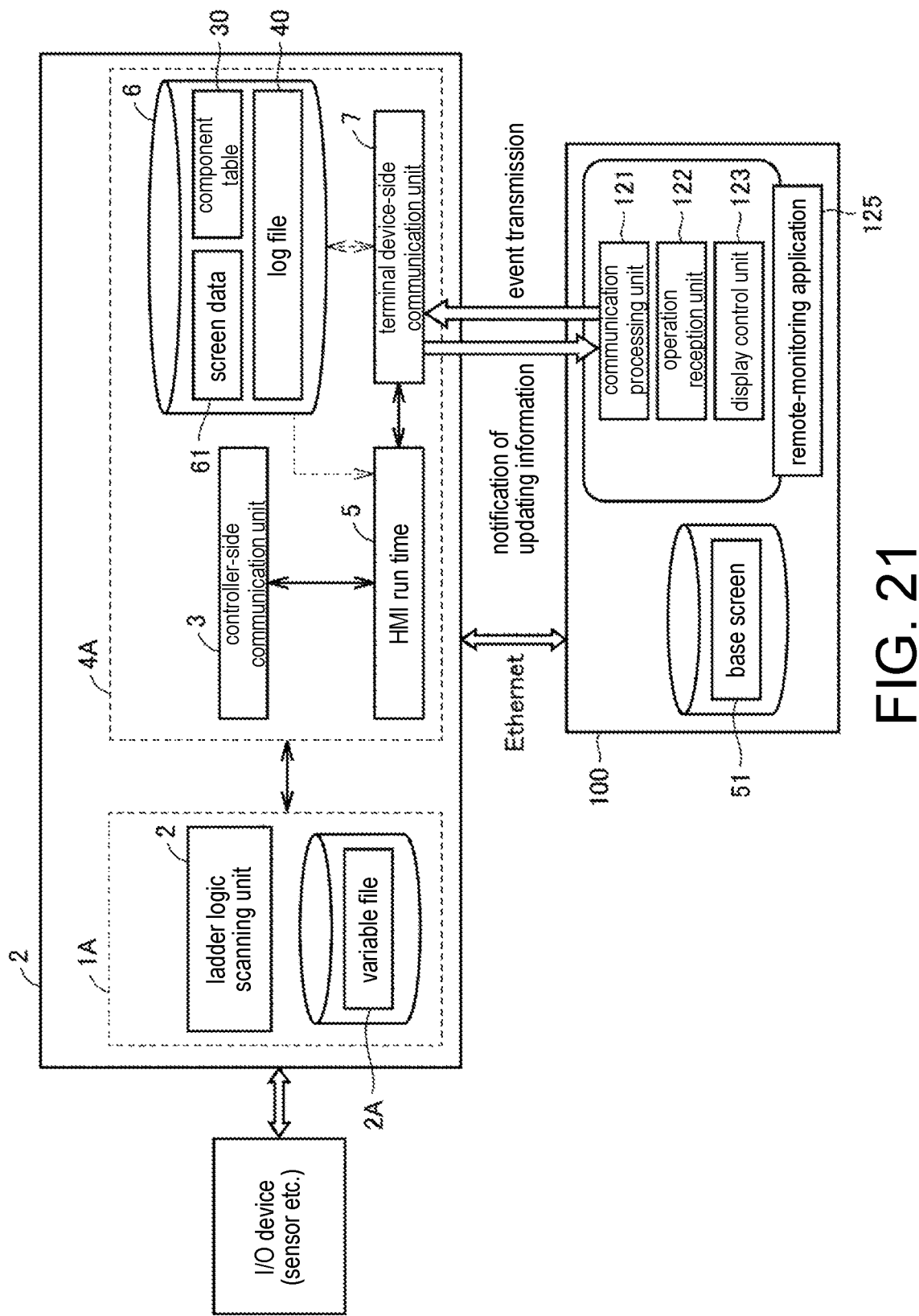
FIG. 21 is a diagram showing a modification example of Embodiment 1.
Figure 22:
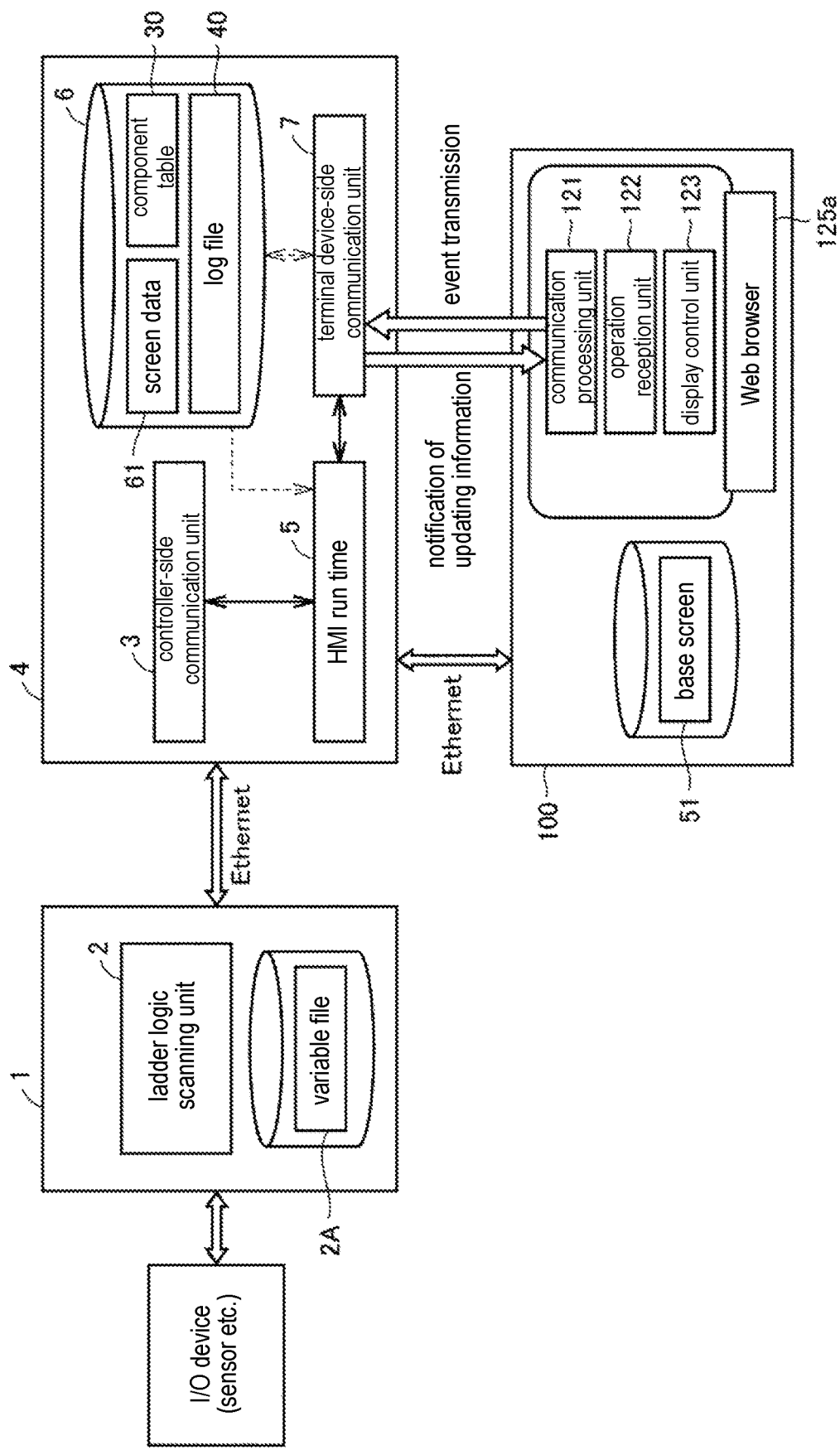
FIG. 22 is a diagram showing a modification example of Embodiment 1.

A modification example of Embodiment 1 described above is shown. FIGS. 21 and 22 are diagrams showing a modification example of Embodiment 1. In Embodiment 1, the configuration in which the controller 1 and the programmable indicator 4 are included as separate bodies as shown in FIG. 4 has been described, but the configuration is not limited thereto. For example, as shown in FIG. 21, a controller 1A and a programmable indicator 4A may be provided as an IPC (Industrial Personal Computer, a so-called industrial computer) 2 that incorporates these functions integrally.

In addition, as shown in FIG. 22, a Web (World Wide Web) browser 125a may be applied instead of the dedicated remote-monitoring application 125 of the terminal device 100. A general-purpose web browser installed in the general terminal device 100 can be used as the web browser 125a.

Although the programmable indicator 4 or the IPC (industrial computer) has been shown as the information device for factory automation connected to the controller 1 in the aforementioned embodiment, a computer with no display may also be used.

In addition, in the aforementioned embodiment, when the terminal device 100 displays a screen on the display 102, the attribute values of the components of the display 102 can be changed, on the basis of information including the field values obtained from the controller 1 or information obtained from the programmable indicator 4. The components include components indicating a clock. The information obtained from the programmable indicator 4 by the terminal device 100 includes information on the time measured by the clock 415. Thereby, the terminal device 100 can change the display of the clock on the display 102 by the change in the time measured by the clock 415 of the programmable indicator 4.

Advantages of Embodiment 1

According to Embodiment 1, when a screen for remotely monitoring the field device is displayed on the terminal device 100, the programmable indicator 4 transmits a part of the screen data 61 to the terminal device 100. Therefore, it is possible to reduce the amount of communication from the programmable indicator 4 to the terminal device 100 and to prevent the switching performance of the screen of the terminal device 100 from being impaired due to the communication load. This advantage is similarly obtained for each terminal device S100 even when a plurality of terminal devices 100 is connected to the programmable indicator 4.

Embodiment 2

In the Embodiment 2, a program for causing the CPU 411 to execute the aforementioned function of the "programmable indicator 4" is provided. In addition, a program for causing the CPU 110 to execute the aforementioned function of the "terminal device 100" is provided. Such programs can also be recorded in a computer-readable recording medium and be provided as a program product, the computer-readable recording medium including a flexible disk, a CD-ROM (Compact Disk-Read Only Memory), a ROM, a RAM, and memory cards 420 and 106 to be attached to the programmable indicator 4 or the terminal device 100. Alternatively, the program can also be provided by being recorded in a recording medium such as the hard disk 114. In addition, the program can also be provided by downloading from a network (not shown) via the communication interfaces 124 and 419.

Moreover, the program may call the necessary modules, among the program modules provided as a part of an OS (operating system) of the programmable indicator 4 or the terminal device 100, at a predetermined timing in a predetermined arrangement, and may execute the process. In this case, the program does not include the aforementioned module, and the process is executed in cooperation with the OS. The program not including such a module can also be included in the program of Embodiment 2.

In addition, the program according to Embodiment 2 may be provided by being incorporated in a part of another program. Even in this case, the program does not include the module included in the aforementioned another program, and the process is executed in cooperation with another program. Such a program incorporated in another program can also be included in the program according to Embodiment 2.

The provided program product is installed in a program storage unit such as a hard disk and executed. Moreover, the program product includes the program and a recording medium in which the program is recorded.

The embodiments disclosed herein should be considered as illustrative rather than restrictive in all respects. The scope of the present invention is defined by the claims instead of the description above, and is intended to include meaning equivalent to the claims and all modifications within the scope.

What is claimed is:

1. An information device for factory automation to be connected to at least one control device which controls an object, the information device comprising:
    a communication interface for communicating with at least one terminal device having a display capable of displaying a screen for remotely monitoring the at least one control device;
    a memory device serving as a storage unit, which stores screen data corresponding to each screen to be displayed on the at least one terminal device; and
    a processor of the information device, for controlling the information device, wherein the information device loads screen data to be displayed from the memory device in response to a connection request from the at least one terminal device,
    wherein the screen includes one or more components placed on the screen,
    screen data for displaying the screen includes attributes of the respective components relating to display and the attributes of the respective components define at least one of display states of the respective components and functions of the respective components,
    wherein the at least one terminal device receives the screen data from the information device to display the screen data on the display of the at least one terminal device,
    when the at least one terminal device switches the screen of the display, the information device transmits a request for obtaining values of various variables to the at least one control device, and performs a first logic to determine whether or not attribute values of the attributes are changed and updated, and
    in a case that the attribute values are changed and updated, the information device transmits an updating notification containing the changed and updated attribute values to the at least one terminal device, and the at least one terminal device receives the updating notification of the respective components placed on the screen in the screen data from the information device to update the screen of the display,
    in a case that the attribute values are not changed and updated, the information device does not transmit the updating notification to the at least one terminal device,
    when the at least one terminal device initiates a screen switching event, the information device receives the screen switching event and performs a second logic associated to the screen switching event, and then loads screen data related to a new screen from the information device, the information device transmits an updating notification for the new screen to the at least one terminal device, and the at least one terminal device switches a present screen to the new screen when receiving the updating notification for the new screen.

2. The information device according to claim 1, wherein the processor acquires the attribute values by executing the first or second logic based on information related to controls of the object from the at least one control device.

3. The information device according to claim 2, wherein when transmitting the attribute values of the components, the processor determines whether to transmit the attribute values to the at least one terminal device by execution of the first logic, based on the attribute values acquired by the execution of a third logic of the component and the attribute values of the component being displayed on the display of the at least one terminal device.

4. The information device according to claim 1, wherein further in a case of accepting a user's operation on the component in the screen of the display, the processor transmits the attributes and the attribute values of the respective components placed on the screen in the screen data to the at least one terminal device via the communication interface.

5. The information device according to claim 1, wherein further in a case of changing the attribute values of the component in the screen of the display based on information obtained from the at least one control device or the information device, the processor transmits the attributes and the attribute values of the respective components placed on the screen in the screen data to the at least one terminal device via the communication interface.

6. The information device according to claim 5, wherein the first logic is different for each component and for each type of user's operation on the component, and in a case where a user operates a component displayed on the display of the at least one terminal device, the processor executes the first logic corresponding to the type of the operation of the component.

7. The information device according to claim 1, wherein the at least one terminal device comprises a Web application, and
the information device communicates with the at least one terminal device by the Web application when the screen is displayed on the display.

8. The information device according to claim 1, wherein the information device for factory automation comprises at least one of a programmable indicator and an industrial computer.

9. A terminal device which communicates with an information device for factory automation to be connected to at least one control device which controls an object, wherein the information device includes a memory device serving as a storage unit, which stores screen data corresponding to each screen to be displayed on the terminal device, the terminal device comprising:
a display capable of displaying a screen for remotely monitoring the at least one control device; and
a processor of the terminal device for controlling the terminal device,
wherein the screen includes one or more components placed on the screen,
a screen data for displaying the screen includes attributes of the respective components relating to display and the attributes of the respective components define at least one of display states of the respective components and functions of the respective components,
wherein the terminal device receives the screen data from the memory device of the information device to display the screen data on the display of the terminal device,
when the terminal device switches the screen of the display, the information device transmits a request for obtaining values of various variables to the at least one control device, and performs a first logic to determine attribute values of the attributes, and
in a case that the attribute values are changed and updated, the information device transmits an updating notification to the terminal device containing the attributes and the changed and updated attribute values, and the terminal device receives the attributes and the changed and updated attribute values of the respective components placed on the screen in the screen data from the information device to update the screen of the display,
in a case that the attribute values are not changed and updated, the information device does not transmit the updating notification to the terminal device,
when the terminal device initiates a screen switching event, the information device receives the screen switching event and performs a second logic to associated to the screen switching event, and then loads a screen data related to a new screen from the information device, the information device transmits an updating notification for the new screen to the terminal device, and the terminal device switches a present screen to the new screen when receiving the updating notification for the new screen.

10. The terminal device according to claim 9, wherein the case of switching the screen of the display includes a time when an updating notification of the screen is received from the information device.

11. The terminal device according to claim 10, wherein the processor transmits a notification of an operation content to the information device when accepting the user's operation on the component in the screen of the display, and
the processor receives the updating notification from the information device with respect to the notification of the operation content.

12. The terminal device according to claim 9, wherein the information device for factory automation comprises at least one of a programmable indicator and an industrial computer.

13. A non-transitory computer-readable recording medium that stores a program for causing a computer to execute a control method of controlling an information device for factory automation to be connected to at least one control device which controls an object, wherein the information device includes a memory device serving as a storage unit, which stores screen data corresponding to each screen to be displayed on at least one terminal device, the control method comprising:
communicating with at least one terminal device having a display capable of displaying a screen for remotely monitoring the at least one control device, wherein the screen includes one or more components placed on the screen, the screen data for displaying the screen includes attributes of the respective components relating to display; and
controlling the information device in a manner that,
when the at least one terminal device switches the screen of the display, the information device transmits a request for obtaining values of various variables to the at least one control device, and performs a first logic to determine attribute values of the attributes, and
in a case that the attribute values are changed and updated, the information device transmits an updating notification containing the attributes and attribute values that are changed and updated to the at least one terminal device, and the at least one terminal device receives the attributes and the changed and updated attribute values of the respective components placed on the screen in the screen data from the information device to update the screen of the display,
in a case that the attribute values are not changed and updated, the information device does not transmit the updating notification to the at least one terminal device,
when the at least one terminal device initiates a screen switching event, the information device receives the screen switching event and performs a second logic associated to the screen switching event, and then loads a screen data related to a new screen from the information device, the information device transmits an updating notification for the new screen to the at least one terminal device, and the at least one terminal device switches a present screen to the new screen when receiving the updating notification for the new screen.

14. The non-transitory computer-readable recording medium according to claim 13, wherein the information device for factory automation comprises at least one of a programmable indicator and an industrial computer.

15. A non-transitory computer-readable recording medium that stores a program for causing a computer to execute a control method of a terminal device which communicates with an information device for factory automation to be connected to at least one control device which controls an object, wherein the information device includes a memory device serving as a storage unit, which stores screen data corresponding to each screen to be displayed on the terminal device, wherein the terminal device comprises a display capable of displaying a screen for remotely monitoring the at least one control device, the screen includes one or more components placed on the screen, the screen data for displaying the screen includes attributes of the respective components relating to the display and the attributes of the respective components define at least one of display states of the respective components and functions of the respective components, and the control method comprising:

switching displaying the screen on the display;

transmitting by the information device a request for obtaining values of various variables to the at least one control device, and performs a first logic to determine attribute values of the attributes; and in a case that the attribute values are changed and updated, the information device transmits an updating notification containing the attributes and the changed and updated attribute values to the terminal device, and the terminal device receives the attributes and the changed and updated attribute values of the respective components placed on the screen in the screen data from the memory device of the information device to update the screen of the display, in a case that the attribute values are not changed and updated, the information device does not transmit the updating notification to the terminal device, when the terminal device initiates a screen switching event, the information device receives the screen switching event and performs a second logic associated to the screen switching event, and then loads a-screen data related to a new screen from the information device, the information device transmits an updating notification for the new screen to the terminal device, and the terminal device switches a present screen to the new screen when receiving the updating notification for the new screen.

16. The non-transitory computer-readable recording medium according to claim 15, wherein the information device for factory automation comprises at least one of a programmable indicator and an industrial computer.

* * * * *